US011418429B2

(12) United States Patent
Chaturmohta et al.

(10) Patent No.: US 11,418,429 B2
(45) Date of Patent: Aug. 16, 2022

(54) ROUTE ANOMALY DETECTION AND REMEDIATION

(71) Applicant: Microsoft Technology Licensing, LLC, Redmond, WA (US)

(72) Inventors: Somesh Chaturmohta, Bellevue, WA (US); Gary R. Ratterree, Kirkland, WA (US); Alireza Khoshgoftarmonfared, Renton, WA (US); Venkata Praneeth Naidu Sanapathi, Bellevue, WA (US); Gaurav Thareja, Redmond, WA (US); Mark A. Kasten, Redmond, WA (US); Scott W. Hanberg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 16/830,082

(22) Filed: Mar. 25, 2020

(65) Prior Publication Data
US 2021/0135982 A1 May 6, 2021

Related U.S. Application Data

(60) Provisional application No. 62/929,641, filed on Nov. 1, 2019.

(51) Int. Cl.
*H04L 45/28* (2022.01)
*H04L 43/10* (2022.01)
(Continued)

(52) U.S. Cl.
CPC .............. *H04L 45/28* (2013.01); *H04L 43/06* (2013.01); *H04L 43/10* (2013.01); *H04L 45/04* (2013.01); *H04L 45/08* (2013.01)

(58) Field of Classification Search
None
See application file for complete search history.

(56) References Cited

U.S. PATENT DOCUMENTS 7,823,202 B1  10/2010  Nucci et al.
9,445,279 B2   9/2016  Li et al.
(Continued)

FOREIGN PATENT DOCUMENTS

CN    1822566 A      8/2006
WO    2017147166 A1  8/2017
WO    2020167820 A1  8/2020

OTHER PUBLICATIONS

Jian Qiu and Lixin Gao, Detecting Bogus BGP Route Information: Going Beyond Prefix Hijacking, pp. 1-10 (Year: 2007).*
(Continued)

*Primary Examiner* — Christopher M Crutchfield
(74) *Attorney, Agent, or Firm* — Han Gim; Newport IP, LLC

(57) ABSTRACT

A route anomaly detection and remediation system analyzes a prefix for each route received to validate the route. A route monitoring component provides a centralized querying system for all routers from all devices to study routing history. A route collection component receives and stores all routes from multiple routers at a server. A set of microservice analysis components performs prefix analysis on each received route. Each microservice analysis component analyzes one or more portions of the prefix for each route to detect hijacked routes, leaked routes, withdrawn routes and/or other unhealthy routes before the routes are utilized for routing traffic on the network. The analysis performs new prefix validation and identifies healthy routes. Alerts identifying invalid routes are transmitted to an incident management system. Healthy routes are approved for usage by (Continued)

routers on the network to prevent network outages while improving network reliability, availability and stability.

20 Claims, 11 Drawing Sheets

(51) Int. Cl.
*H04L 45/00* (2022.01)
*H04L 43/06* (2022.01)
*H04L 45/02* (2022.01)

(56) References Cited

U.S. PATENT DOCUMENTS

| | | | |
|---|---|---|---|
| 10,700,928 | B2 | 6/2020 | Li |
| 11,012,294 | B2 | 5/2021 | Ratnasamy et al. |
| 2004/0221296 | A1 | 11/2004 | Ogielski et al. |
| 2006/0047809 | A1* | 3/2006 | Slattery ............. H04L 67/025 709/224 |
| 2012/0099440 | A1 | 4/2012 | Dong et al. |
| 2014/0317293 | A1 | 10/2014 | Shatzkamer |
| 2016/0330236 | A1 | 11/2016 | Reddy et al. |
| 2017/0177396 | A1 | 6/2017 | Palermo et al. |
| 2017/0180418 | A1 | 6/2017 | Shen et al. |
| 2019/0098046 | A1 | 3/2019 | Schlamp |
| 2019/0196731 | A1 | 6/2019 | Sapuntzakis et al. |
| 2019/0208404 | A1 | 7/2019 | Georgiev |
| 2020/0081648 | A1 | 3/2020 | Bernat et al. |
| 2020/0159421 | A1 | 5/2020 | Karumbunathan et al. |
| 2020/0162282 | A1* | 5/2020 | Ashtaputre ......... H04L 12/4641 |
| 2020/0210376 | A1 | 7/2020 | Vaideeswaran et al. |
| 2021/0011623 | A1 | 1/2021 | Fay et al. |
| 2021/0019093 | A1 | 1/2021 | Karr et al. |
| 2021/0105191 | A1 | 4/2021 | Yang et al. |
| 2021/0132976 | A1 | 5/2021 | Chandrappa et al. |

OTHER PUBLICATIONS

M. S. Siddiqui, D. Monterot, M. Yannuzzi, R. Serral-Graciat, X. Masip-Bruin, Diagnosis of Route Leaks Among Autonomous Systems In The Internet, pp. 1-6 (Year: 2014).*

Zheng Zhang, Ying Zhang, Y. Charlie, Hu Z and Morley Mao, Practical Defenses Against BGP Prefix Hijacking, pp. 1-12 (Year: 2007).*

P. Mohapatra, J. Scudder, D. Ward, R. Bush and R. Austein, BGP Prefix Origin Validation, pp. 1-13 (Year: 2011).*

"International Search Report and Written Opinion Issued in PCT Application No. PCT/US20/057437", dated Mar. 12, 2021, 16 Pages.

"International Search Report and Written Opinion Issued in PCT Application No. PCT/US20/056215", dated Jan. 27, 2021, 14 Pages.

"Notice of Allowance Issued in U.S. Appl. No. 16/888,441", dated May 28, 2021, 13 Pages.

Byrne, Gavin, "BGP Withdrawn Route Monitoring", Retrieved from: http://web.archive.org/web/20190713101926/https://www.corvil.com/blog/2014/bgp-withdrawn-route-monitoring, Jul. 23, 2014, 5 Pages.

Goodin, Dan, "Repeated Attacks Hijack Huge Chunks of Internet Traffic, Researchers Warn", Retrieved from: https://arstechnica.com/information-technology/2013/11/repeated-attacks-hijack-huge-chunks-of-internet-traffic-researchers-warn/, Nov. 20, 2013, 8 Pages.

Ravi, et al., "Azure Peering Service Preview Overview", Retrieved from: https://docs.microsoft.com/en-us/azure/peering-service/about, Nov. 4, 2019, 6 Pages.

Testart, et al., "Profiling BGP Serial Hijackers: Capturing Persistent Misbehavior in the Global Routing Table", In Proceedings of the Internet Measurement Conference, Oct. 21, 2019, pp. 420-434.

Toonk, Andree, "Massive Route Leak Cause Internet Slowdown", Retrieved from: https://www.bgpmon.net/massive-route-leak-cause-internet-slowdown/, Jun. 12, 2015, 3 Pages.

Vervier, "Mind Your Blocks: On the Stealthiness of Malicious BGP Hijacks", In Proceedings of 22nd Annual Network and Distributed System Security Symposium, Feb. 8, 2015, 15 Pages.

* cited by examiner

ROUTE ANOMALY DETECTION AND REMEDIATION

BACKGROUND

Border Gateway Protocol (BGP) is a distance vector routing protocol for distribution of routes between autonomous systems (AS). It was developed to provide a method of route synchronization in computing networks. In modern cloud network designs, BGP offers each AS privilege to define and implement its own routing policies towards acceptance and advertisement of routes among peers. BGP is also the main routing protocol for cloud computing systems and other online services. However, BGP is primarily a trust-based protocol unable to detect or remediate anomalous routes. Previous solutions involve router configuration to prevent invalid route advertisement. This solution requires configuration of all routers which is time consuming, inefficient and lacks scalability. Moreover, router configuration fails to address problems associated with route hijacks, route leaks and route withdrawals.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to solutions for a route anomaly detection and remediation system. The system includes a processor and a computer-readable medium storing instructions. The system performs a prefix analysis on a routing prefix associated with an internet protocol (IP) address of a selected route in a set of routes received from at least one router device in a set of routers. The prefix analysis includes decoding at least one message received from the at least one router device to convert route data to a compatible data structure for analysis to detect unhealthy routes, including leaked routes. A peer autonomous system (AS) portion of the routing prefix of the selected route is analyzed to determine whether the selected route is a leaked route. A leaked route is an unhealthy route. The system generates a validation score indicating whether the selected route is a healthy route, or an unhealthy route based on the prefix analysis. The selected route is assigned to a set of validated routes for utilization during routing of network traffic by the set of routers responsive to the validation score indicating the selected route is a healthy route. An alert is sent to a fault alerting system responsive to the validation score indicating the selected route is an unhealthy route.

Other examples provide a method of route anomaly detection and remediation. A prefix analysis is performed on a routing prefix associated with an internet protocol (IP) address of a selected route in a set of routes received from at least one router device in a set of routers. The prefix analysis includes decoding at least one message received from the at least one router device to convert route data to a compatible data structure for analysis to detect unhealthy routes, including hijacked routes; and analyzing an origin autonomous system (AS) portion of the routing prefix associated with a selected route from the set of routes to determine whether the selected route is a hijacked route. A hijacked route is an unhealthy route. A validation score is generated for each route in the set of routes indicating whether each route is a healthy route, or an unhealthy route based on the prefix analysis. A set of validated routes from the set of routes is identified for utilization during routing of network traffic by the set of routers based on the validation score for each route. Routes from the set of routes having the validation score indicate a healthy route are assigned to the set of validated routes for utilization by the set of routers. A set of invalidated routes in the set of routes is identified. The set of invalidated routes including one or more hijacked routes. The set of invalidated routes is removed from the network.

Yet other examples provide a computer storage device having computer-executable instructions stored thereon for route anomaly detection and remediation. A prefix analysis is performed on an IP address routing prefix associated with a selected route in a set of routes received from at least one router device in a set of routers. The prefix analysis includes decoding at least one message received from the at least one router device to convert route data to a compatible data structure for analysis to detect unhealthy routes, wherein an unhealthy route comprises a hijacked route or a leaked route; and analyzing an origin AS portion of the routing prefix associated with a selected route from the set of routes to determine whether the selected route is a hijacked route. A peer AS portion of the routing prefix of the selected route is analyzed. A validation score indicating whether the selected route is a healthy route, or an unhealthy route is generated based on the prefix analysis. An alert is sent to a fault alerting system responsive to the validation score indicating the selected route is an unhealthy route, the unhealthy route comprising at least one of a hijacked route, a leaked route or a withdrawn route.

BRIEF DESCRIPTION OF THE DRAWINGS

The disclosed examples are described in detail below with reference to the accompanying drawing figures listed below.

DETAILED DESCRIPTION

Figure 1:
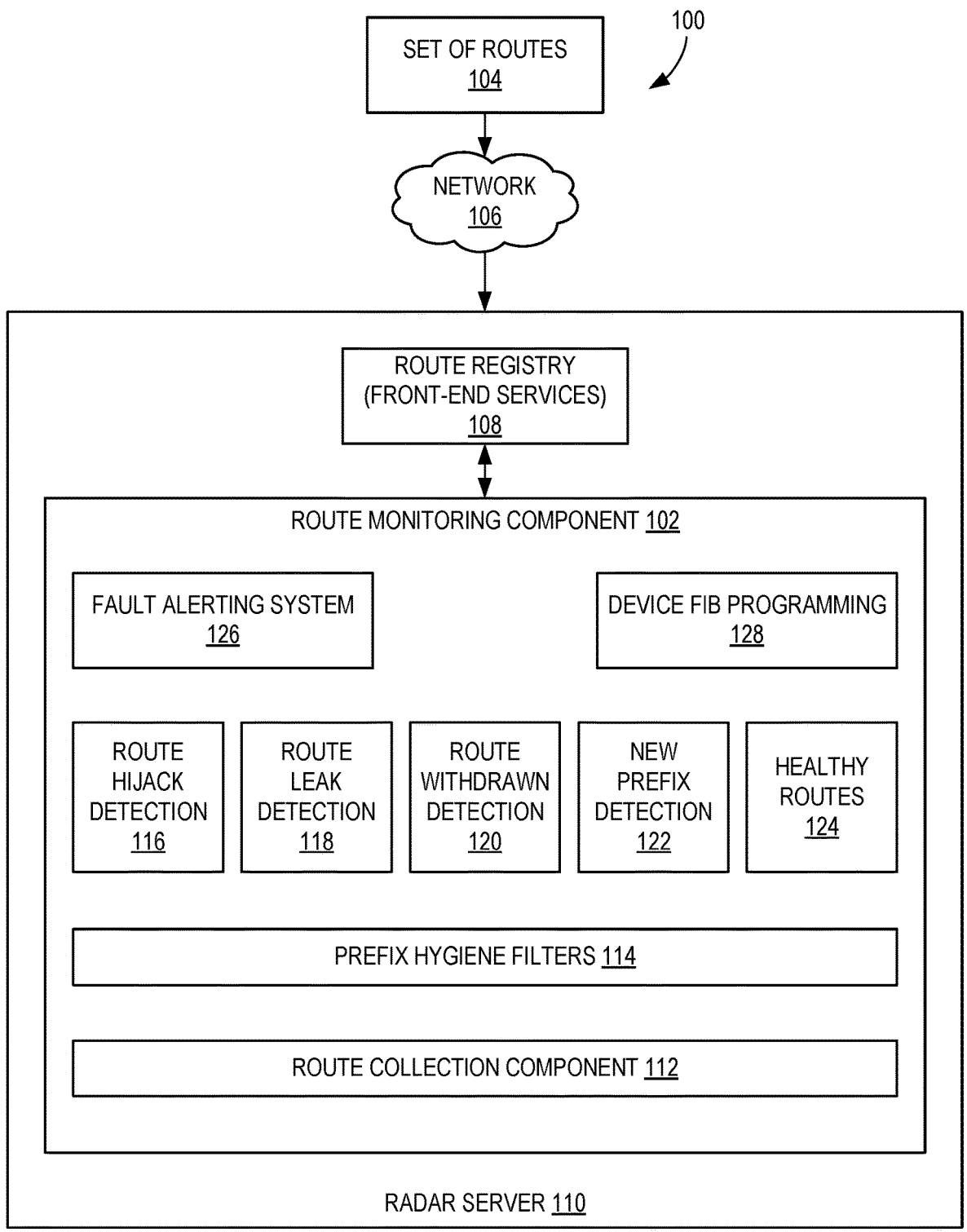
FIG. 1 is an exemplary block diagram illustrating a system for route anomaly detection and remediation (RADAR).

Many current enterprise systems virtual machine (VM) or virtual network (VNET) complex currently use a 'fire and forget' methodology of accessing the private network and the public Internet. Each service today only has the concept of a default path into the network. If that path does not work or needs modification, there is currently no recourse for the service. Some large networks use separate BGP autonomous systems numbers (ASNs) for each of its data centers to decentralize and harden route distribution across the network, datacenters, and to the Internet. However, this does not prevent publication of bad routes, which can lead to network outages and unavailability of online services to users. Moreover, implementation of BGP in complex, enterprise systems with multiple policies and route preference rules can increase vulnerability of these systems to outages due to configuration changes and/or network maintenance. These events, in addition to route hijack, route withdrawal and route leak events, can result in network outages, decreased system reliability, increased operational costs, increased latency and/or inaccessible online services.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Aspects of the disclosure describe a route anomaly detection and remediation (RADAR) system. RADAR is a software defined network controller to overcome limitations of BGP (border gateway protocol) protocol. BGP is a protocol that uses transmission control protocol (TCP) as its transport protocol for sending route information over a network. It is designed for internet scale with changes propagating to networks around the world within minutes. It is rich in functionality in terms of information it can carry and network topologies it can handle. However, as a network grows beyond more than a few routers and becomes more complicated, the short comings of BGP are exposed.

The BGP protocol has been highly adopted in modern cloud network designs. BGP offers each autonomous system (AS) the ability to define and implement its own routing policies towards acceptance and advertisement of routes amongst each other. This exclusive per-autonomous system control and insufficient security measures in the BGP create increasing risks of anomalous route propagation due to malicious activity as well as human error which can result in outages and loss of online services. Events of misconfiguration/human errors can result in outages, traffic drift, network congestion, complete datacenter isolations as well as specific service impacts. BGP lacks prefix filters and instead relies on network configuration of devices to prevent or avoid misconfigurations, which does not scale and needs constant updating. This limits the number of routes, limits the minimum length of prefixes, and limits the value in AS Path.

The disclosed RADAR server provides a route monitoring component which receives all routes from multiple routers and performs prefix analysis (anomalous route detection) on each route. In some examples, the RADAR server is a software as a service (SaaS), such as a host running on a cloud server. In other examples, the RADAR server is a physical host device running the route monitoring component.

Some cloud networks peer with hundreds or thousands of entities on the Internet over thousands or tens of thousands of BGP sessions globally. The RADAR server 110 can assist these enterprise systems with maintaining a reliable connection to the Internet. This high footprint of connections offers an exclusive advantage (as probes/vantage points) to visibility into the anomalies and misconfiguration on the Internet that redirects traffic to inappropriate destinations.

Aspects of the disclosure provide a suite of microservice analysis components within the microservice architecture. All incoming routes are sent to the set of microservice analysis components for anomalous route detection prefix analysis. This analysis enables the route monitoring to filter out anomalous routes before they are utilized on a selected network. In this manner, only filtered and validated routes are utilized to route traffic on the network. The set of microservice analysis components minimizes or eliminates occurrence of bad routes, such as hijacked routes, leaked routes or withdrawn routes during routing of data on the network to prevent network outages and other incidents impacting network service by performing the prefix analysis on all routes rather than relying on individual router devices to filter routes. The results of such analysis can be fed to other components of the network that can perform remediation against the effects of the detected hijack and leak effects.

In some examples, the route monitoring component performs analysis of prefix ownership to validate routes using multiple open source proprietary databases of prefix ownership. This analysis of ownership enables the system to identify hijacked routes being used/published by someone that does not own the route as well as identify routes leaked by an entity that does not own it. The route hijack analysis and route leak analysis components improve reliability and stability of the network services while reducing costs and preventing downtime associated with online services by identifying anomalous routes.

Route hijack and route leak events are the most common type of internet events which can frequently cause service impact globally as well as a big source of malicious/spam attacks targeted towards specific organizations. Many enterprise cloud services have suffered network outages and loss of services due these type of route hijack and leak events. The route hijack detection and route leak detection components in some examples detect hijacked routes and leaked routes prior to utilization of these routes on the network. The route hijack detection and route leak detection components provide improved network security while minimizing the consequences of human errors.

Furthermore, a route collection component receives all the routes received from multiple router devices and stores them on the route collection component. The route collection component enables the system, as well as users, to obtain a full and complete view of healthy routes and all bad/unhealthy routes encountered by the system. This route collection component can provide a global view of anomalous routes, their sources, trends, anomaly types, and remediation successes and failures. It can further provide a snapshot of the system that allows studying the attributes of each prefix for which the system has routing information.

Aspects of the disclosure provide network insight to paths for destination which will be helpful for capacity provisioning, fault tolerance, and exit paths. The analysis performed by the set of analysis components and the fault alerting system alert generation performed based on historical route data, including anomalous route trends, provide incident management with more complete and more accurate information for debugging, tracking incidents, and improving incident response as a network grows over time. The fault alerting system improves human-machine interface by reducing user time spent gathering incident data, analyzing incident-related data and handling/remediating incidents associated with the network while also providing more detailed information regarding each detected anomalous route.

In other examples, the route monitoring component provides a centralized controller for managing route filtering and route validation instead of relying on multiple routers for filtering and management. The route monitoring component reduces reliance and usage of router network resources and outages due to human error or malicious activity. It also increases the visibility of anomalies in the system by providing a centralized view of such events.

In some examples, the RADAR server operates within a cloud computing environment. With the large amount of compute power and large data processing and intelligence available in the cloud, BGP routing paradigm can be moved partially into the cloud system itself. The route monitoring component hosted on a cloud server in some examples reduces local memory usage and processor usage while improving network reliability. This move allows for a central view of routing integrity, alarming for missing or incomplete routes, routing anomalies detection and mitigation service.

The system additionally provides advantages in terms of scalability in the collection and analysis of routes by the route collection component and the microservice analysis components. The RADAR server can accurately and efficiently handle collection, storage and analysis of millions of routing advertisements per hour to detect anomalous routes and prevent utilization of anomalous routes on a selected network for improved security, network reliability, and more efficient resource utilization.

FIG. 1 is an exemplary block diagram illustrating a system 100 for RADAR. A route monitoring component 102 is a collection of microservices analyzing or processing the part of a received route.

The route collection component 112 in some examples receives a set of one or more routes 104 at a route registry 108 via a network 106. The set of routes 104 is a set of one or more routes published over the Internet by one or more entities.

The route registry 108 is a set of front-end services provided on a RADAR server 110. The front-end is a stateless gateway service. In some non-limiting examples, the route registry 108 front-end services process BGP monitoring protocol (BMP) messages and convert the route data to a suitable, compatible data structure for analysis by the set of microservices. The front-end processes BMP messages and converts them to compatible data structure for the route monitoring component. A compatible data structure refers to a format or data structure for route data which is suitable for leak analysis and hijack analysis. Converting data into the compatible data structure can include, for example, but without limitation, parsing the route data, decoding the route data, reformatting the data into a structure compatible with a data storage device, etc. When the route is received from the routers, it is converted to the compatible data structure to make it readable for the RADAR system. This readout converts it to the compatible data structure which can be stored and displayed correctly by the RADAR system 100 and/or system data storage.

The RADAR front-end also performs decoding of BGP messages like community, AS path local preference, multi-exit discriminator (MED) attribute, and/or next hop. The front-end converts the BGP messages to meaningful values for the system. It processes the routes in batch to optimize performance and sends them to route collection computer for further analysis.

In an example, a set of BGP routes received on the RADAR server 110 are sent through a parser and a decoder. A partition resolver determines which route collection monitor instance each route should be sent. This partitioning in some examples is done so that the load of route analysis and anomaly detection can be divided among multiple servers.

In other words, the RADAR server 110 can include multiple route collection component. Each route collection component receives and stores routes within a given prefix range for scalability. Thus, when a new route is received, the partition resolver determines which route collection component should receive and store the new route based on the prefix and the range of prefixes assigned to each route collection component. Thus, a first route having a first prefix value may be assigned to a first route collection component associated with a first partition for Internet protocol version 4 (IPv4) routes while a second route collection component associated with in a second partition assigned to a different range of prefixes for Internet Protocol version 6 (IPv6) routes receives a second route having a different prefix than the first route. An IP address is treated as a binary number for the machine but can be stored as text for human readers. For example, a 32-bit numeric address (IPv4) is written in decimal as four numbers separated by periods. The IPv6 addresses are 128-bit IP address written in hexadecimal and separated by colons.

In an example, a route having a prefix within a range from 0.0.0.0-31.255.255.255 can be sent to one route collection component in associated with a first set of partitions while a route having a prefix within a range from 30.0.0.0-61.255.255.255 is sent to a route collection component of a second set of partitions. In another non-limiting example, a route having a prefix within the range from 240.0.0.0-255.255.255.255 could be sent to a third route collection component associated with a third set of partitions. When the partition resolver has identified the appropriate route collection component partition for a given received route partition, the given route partition is placed into the partition send queue for that appropriate route collection component.

The route monitoring component 102 provides a centralized controller for detecting bad routing on the internet. The route monitoring component 102 analyzes all the routes received from the route collection component and validates authenticity of each route. It generates alerts when a valid route goes missing from the network (route withdrawn), when origin AS changes for the route to an organization which does not own the route (route hijack) and when the network taking the traffic does not have enough capacity to handle the traffic for the route (route leak).

The RADAR server is a host running or otherwise supporting the route monitoring and remediation services provided by the route monitoring component 102. The RADAR server can be implemented as a physical computing device or a cloud server associated with one or more physical computing devices, such as physical servers in a data center.

The network 106 consists of one or more physical network components, such as, but without limitation, routers, switches, network interface cards (NICs), and other network devices. The physical network components in some examples is located on the RADAR server, but in other examples are located on a remote computing device, such as, but not limited to, a physical computing device at a data center. The network 106 is any type of network for enabling communications with remote computing devices and/or networks, such as, but not limited to, a local area network (LAN), a subnet, a wide area network (WAN), a wireless (Wi-Fi) network, or any other type of network. In this example, the network 106 is a WAN. However, in other examples, the network 106 is a local or private LAN, a public or private WAN, an Ethernet, the Internet, or any other type of network.

A route collection component 112 receives the set of routes 104 from one or more router devices. The route collection component 112 stores the set of routes on a data store associated with the RADAR server and sends the route to the route analysis components, such as, but not limited to, the set of analysis components 306 in FIG. 3. The data store can be implemented as a physical data storage device located on the RADAR server or a remote data storage device accessed via the network 106. This storage is implemented in a persistent manner so that the routing data is preserved through the life cycle of the collection component.

The route collection component 112 can include one or more prefix hygiene filters 114. The prefix hygiene filters 114 analyze the set of routes 104 and filter out any prefixes which should not have been received by the route monitoring component 102. The basic hygiene filter is a list of prefixes from which we should not receive routes. For example, a basic hygiene filter can specify that routes should not be received from a private ASN.

The route collection component 112 in some examples feeds each received route in the set of routes 104 to a set of analysis components for prefix analysis to detect route anomalies. The route anomaly detection in some examples includes route hijack detection 116, route leak detection 118 and/or route withdrawal detection 120. A hijacked route is a route advertised by an autonomous system that does not own the route. In other examples, a route leak occurs when an entity advertises a route that it should not advertise due to capacity concerns. For example, if a large network entity advertises a route associated with a much smaller network, the smaller network can choke if the leaked route is used to transmit large amounts of traffic. A withdrawn route is a previously valid and reliable route that is no longer available.

The route hijack detection includes an analysis of an origin AS portion of the routing prefix associated with a selected route. Route hijack detection analyzes the origin AS for route advertisement(s) to detect BGP route hijacking of the selected route. BGP route hijacking can also be referred to as prefix hijacking, route hijacking or IP hijacking. BGP route hijacking is the illegitimate usage or takeover of an IP address or block of IP addresses by corrupting Internet routing tables maintained using BGP.

In some examples, the route hijack detection 116 detects and/or mitigates the route hijack of "N level" where 0<N<AS-Path-Length for smaller/same size subnets. The "N-level" Hijack means the hijack at origin or anywhere in the AS path man in the middle (MIM) attack. The route leak detection 118 detects route leak scenarios where a smaller ISP has leaked the routes learned from Tier1 ISPs, etc. The route hijack detection 116 can detect/mitigate the short durations (5 mins or so) hijack events, where the prefixes were hijacked for short duration only and released.

In still other examples, the route hijack detection 116 detect the legit routing activities (using sibling AS concepts where a prefix can be originating from a sibling AS that belongs to the same organization from malicious activities for higher accuracy. The route hijack detection 116 supports the forwarding plane data to better detect/correlate the expected hijack events with change in performance from these prefixes, such as change in round trip time (RTT) and/or time to live (TTL).

The route monitoring component 102 in other examples performs new prefix validation 122 on routes that are unrecognized. An unrecognized route is a route the system has never encountered previously. Whenever an entity announces a network route, a prefix associated with that source is included. There are tables of these prefixes, but there can be human error (non-intentional) while entering route data which corrupts the prefixes. Likewise, prefixes can be maliciously (intentionally) hijacked.

When a new prefix is announced, the system identifies and validates that new prefix automatically at the server through comparison against multiple open source and proprietary databases as well as internal databases. The system propagates that validation to all routers on the network. In some examples, the new prefix validation 122 detects and validates any new prefix advertisement on the internet for a user/entity. The new prefix validation 122 records the subnets not advertised on Internet. Basically, the subnets allocated but not advertised. The resolution should be up to/24 2P block size. New prefix validation ensures this space is correctly owned by the entity announcing it. If the system cannot validate the new route, it is included in the routing table of the routers.

If the route monitoring component 102 identifies an anomalous route, a fault alerting system 126 generates one or more alerts associated with the anomalous routes. The anomalous routes can include hijacked routes, leaked routes or withdrawn routes.

After generating the alert, the fault alerting system can take one or more actions. The set of actions taken in response to detecting an unhealthy route and/or sending an alert can include isolating the route, removing/deleting the route from the network, sending a notification to a user regarding the unhealthy route/alert, generating a summary information report describing the unhealthy route, sending an alert to one or more user devices, placing the route into an invalidated route group, classifying the route as an unhealthy route, identifying the route for additional analysis/ investigation by an internal incident management system (IcM), generate an incident ticket associated with the route, remove the route from the set of stored routes on the route collection component a threshold time-period after determining the route is withdrawn, etc. A summary information report can include the alert, alert data, historical data associated with the route, suspicious activity identified for the route, identification of route owner, score(s) generated by the set of analysis (microservice) components, aggregated validation score, or any other route-related data associated with the anomalous route determination by the RADAR server.

In some examples, the actions can include sending the alert to an incident management (IcM) system. In this example, the alert includes incident related data, such as the data which is included in an incident ticket or other incident reporting. The IcM utilizes the alert data and any other provided anomalous route description data to determine how to remediate the issue. The IcM can remove the route from the network, isolate the route, further investigate the route/ perform additional analysis or testing, identify other related anomalies on the system associated with the bad (unhealthy) route, etc.

In another example, after an alert is sent, the alert data and other route-related data can be aggregated into a report or other display for viewing by a user. In other words, the system can generate an output report, alert summary or aggregation of data related to the anomalous route for review by one or more users. The route-related data can be output to the user via a user interface device or transmitted via a network to a user device for user review.

If a user sends a query associated with the route or the alert to the route monitoring component, the route collection can display the alert data to the user in response to the query via a user interface device associated with the RADAR server 110. The alerting system can also optionally transmit the alert to another computing device associated with IcM or a querying user via the network, such as, but not limited to, a user device, such as a smart phone, a tablet computing device, a desktop computing device, a smart watch, or any other type of computing device having a processor, a memory, a network device (communications interface device) and a user interface device.

The route monitoring component 102 identifies healthy routes 124 in the set of routes based on the results of the prefix analysis. A healthy route is a route validated or approved for use after analysis for route anomalies by the set of microservice analysis components. In some examples, a healthy route is a route having a score generated by the set of microservice analysis components and/or the scoring component that is within a healthy score range. Likewise, an unhealthy route is a route having a score which is within an unhealthy score range indicating the unhealthy route is unsuitable for utilization due to the probability it is a leaked route, a hijacked route, a withdrawn route, suspicious activity associated with the route or otherwise an anomalous route.

In another example, a healthy route is a route which is assigned to a healthy route or valid route category. Routes can be assigned to the healthy route category or classification or a validated route group based on the score(s) generated for each route by the set of analysis components and/or a scoring component. An unhealthy route is any route assigned to an unhealthy route category/classified as an unhealthy route or placed into an invalidated route group based on the score(s) generated for each route.

The route monitoring component 102 takes action with regard to each route based on the assigned category or classification for each route. For example, routes in the healthy category or the validated group of routes are approved for use and sent back to routers. The routes in the unhealthy category or the invalidated group are not approved for use. Additional action such as alerting or reporting to a user can also be taken with regard to unhealthy routes.

The healthy routes 124 are routed to the device forward information base (Fib) programming 128. In this manner, the route monitoring component provides a filtering and analysis solution to prevent invalid route advertisement at on a server. The route monitoring component processes all these routes on the server to detect invalid routes. The route monitoring component looks up the history of the route advertisement to detect bad routes on the network. The route monitoring component has two remediation. The route monitoring component can send alerts to incident management with a list of potential bad routes or remove the bad routes from the network.

In other examples, the route collector receives the validation score for a selected route. It can combine the score(s) and other data to present one view to the user or present the information to the fault alerting system. This creates a loop back to the route collection, where the route collection component sends a route to the anomaly detection and receives back the validation score for the route.

In some examples, the system 100 includes a distributed systems platform (not shown) microservices architecture that makes it easier to package, deploy, and manage scalable and reliable microservices and containers. The platform, in other non-limiting examples, enables a user to build and manage scalable and reliable applications composed of microservices for anomalous route detection that run at high density on a shared pool of machines, which is referred to as a cluster. It provides a sophisticated, lightweight runtime to build distributed, scalable, stateless, and stateful microservices running in containers. It also provides comprehensive application management capabilities to provision, deploy, monitor, upgrade/patch, and delete deployed applications including containerized services. Stateless microservices (such as protocol gateways and web proxies) do not maintain a mutable state outside a request and its response from the service. Stateful microservices (such as user accounts, databases, devices, shopping carts, and queues) maintain a mutable, authoritative state beyond the request and its response. Internet-scale applications frequently consist of a combination of stateless and stateful microservices. The route monitoring component 102 in some examples further includes a collection of stateful and stateless service(s) to analyze the selected route prefix and propagate alerts and/or validated routes through a service chain respectively.

The route monitoring component 102 can manage all internal and external routes in a network for improved network integrity, availability and anomaly detection. The route monitoring component 102 acts as a BGP controller providing a central view for all the network routes providing reputation-based scoring for integrity, stability and availability of a route. The control can detect good versus anomalous routes and accordingly program the network devices with healthy routes.

The route monitoring component 102 in other examples performs a prefix analysis on a routing prefix associated with an internet protocol (IP) address of a selected route in a set of routes received from at least one router device in a set of routers. The prefix analysis includes decoding at least one message received from the at least one router device to convert route data to a compatible data structure for analysis to detect unhealthy routes, including leaked routes. Decoding refers to parsing the route to identify the peer AS portion of the route, etc. The prefix analysis can also include analyzing a peer autonomous system (AS) portion of the routing prefix of the selected route to determine whether the selected route is a leaked route and/or analyzing an origin autonomous systems (AS) portion of the routing prefix associated with the selected route to determine whether the selected route is hijacked.

In other examples, the route monitoring component 102 generates a validation score indicating whether the selected route is a healthy route, or an unhealthy route based on the prefix analysis results. The route monitoring component 102 assigns the selected route to a set of validated routes for utilization during routing of network traffic by the set of routers responsive to the validation score indicating the selected route is a healthy route. The route monitoring component 102 sends an alert to a fault alerting system responsive to the validation score indicating the selected route is an unhealthy route.

The RADAR server in other examples can replace the traditional route reflector services currently in use. In traditional networks, the internal BGP (iBGP) speakers are maintained in a full mesh to realize routing consistency. This methodology does not scale well in large networks as the mesh grows at the square of the network size.

The iBGP route reflectors create a smaller global mesh, where each regional has 2-4 speakers to distribute routes into the region. The route reflectors can be placed in each region to accomplish this goal. A route reflector does not currently perform any traffic processing and exists solely to process and forward BGP messages to the network. If a network WAN has two route reflectors per region and a complete outage occurs due to human error where both route reflectors went down, the current solution is to add an additional route reflector. However, maintaining three route reflectors every region does not scale upward due to an increase in the routing table size on the WAN devices.

Since there is no hardware processing, this function can be replaced by the WAN Route Registry system. The system performs the classic functions of route reflection, however, each route can be pre-processes via the route reputation service and the route monitoring service to ensure that only high-quality/validated/healthy routes reach each region. It can also provide protection against misconfiguration of the network by checking for business parameters such as leakage of private reuse space, and the reception of an entity address space from an Internet entity.

In other examples, RADAR server 110 can be used to provide a hybrid system in which a network retains the current router-based route reflectors. The route reflectors can offer routes at a much lower priority than the software-based RADAR service. That way if the software service encounters a catastrophic upset, the hardware devices will be able to provide a minimal set of routing updates to the network during this event.

The RADAR system in some examples can be tied into an enterprise systems VNET architecture to provide routing data directly into the entity data path system. The VNET gateway can query the RADAR (route registry service) in real time to receive a routing object for a destination of choice of the user. This route object can be used by the stack to encapsulate the proper routing meta-data on the packets to automatically route them to the proper destination. For example, if a VM in US East needs to access a VM in Europe West today, it simply forwards the packet to its next hop gateway (the default route) and the packet is then forwarded in a transparent method from the service.

With the route registry, the VM and/or VNET controller can receive the meta-data to place on the packet to route the service to the Europe West region over the backbone. Since the service now has the concept of a set of meta-data for Europe West, it can also correlate high percentages of timeouts from TCP to the enterprise service stack and report a possible path problem. Alternative paths can then be presented to the VM with explicit routing stacks on the packet to reach the destination over alternative paths. Paths with highly correlated failure domains can be reported to the operational teams for automatic remediation. High suspicion paths can be quarantined by the route registry until they are cleared by the operational system.

Figure 12:
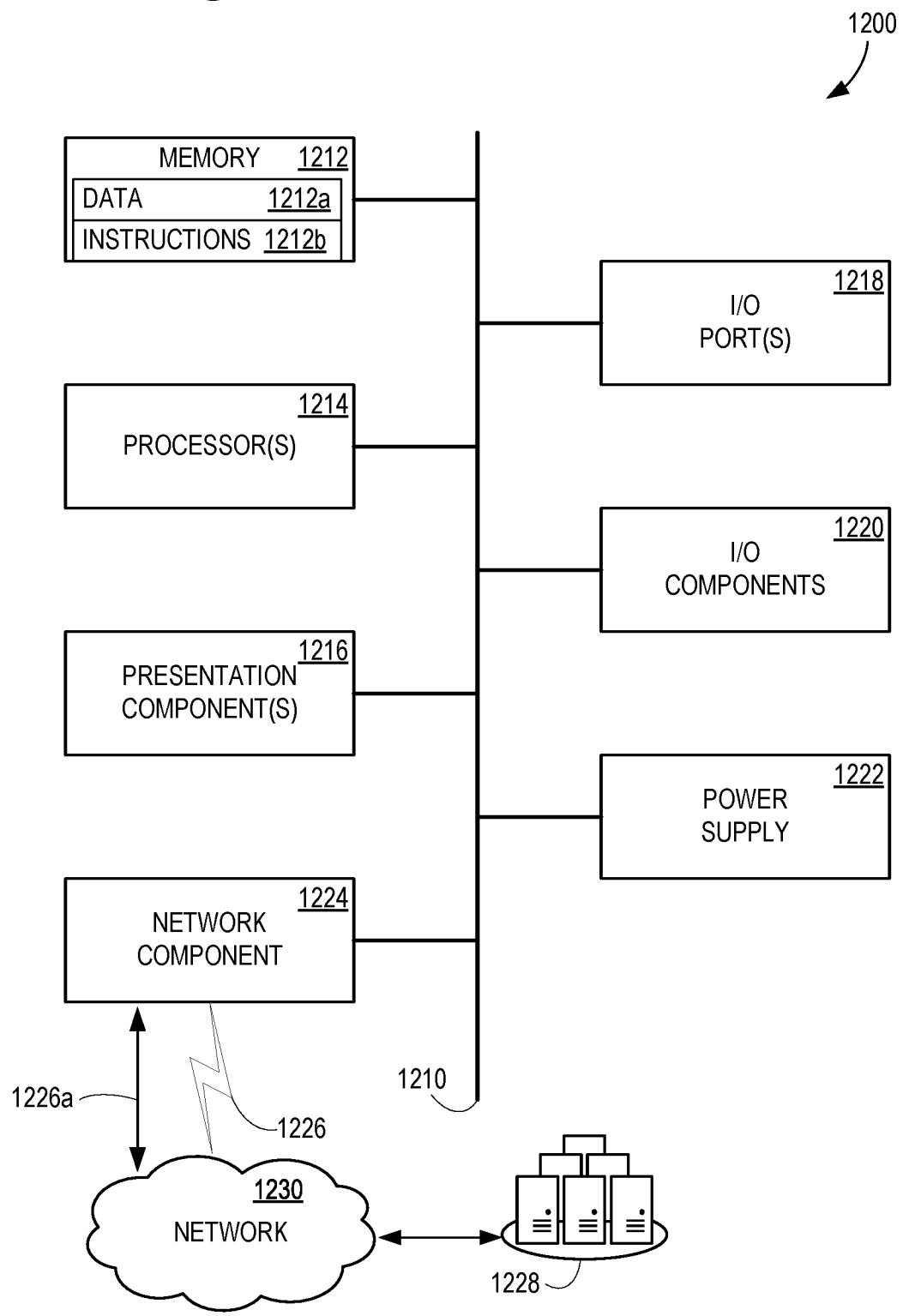
FIG. 12 is exemplary block diagram illustrating an example computing environment suitable for implementing some of the various examples disclosed herein.

In general, the various components of the system 100 may be implemented on a plurality of computing devices 1200 and/or a cloud resource 1228, which are described in further detail in relation to FIG. 12. Thus, at least some of the operations described herein may be implemented by a processor executing instructions that are stored on a computer-readable medium.

Figure 2:
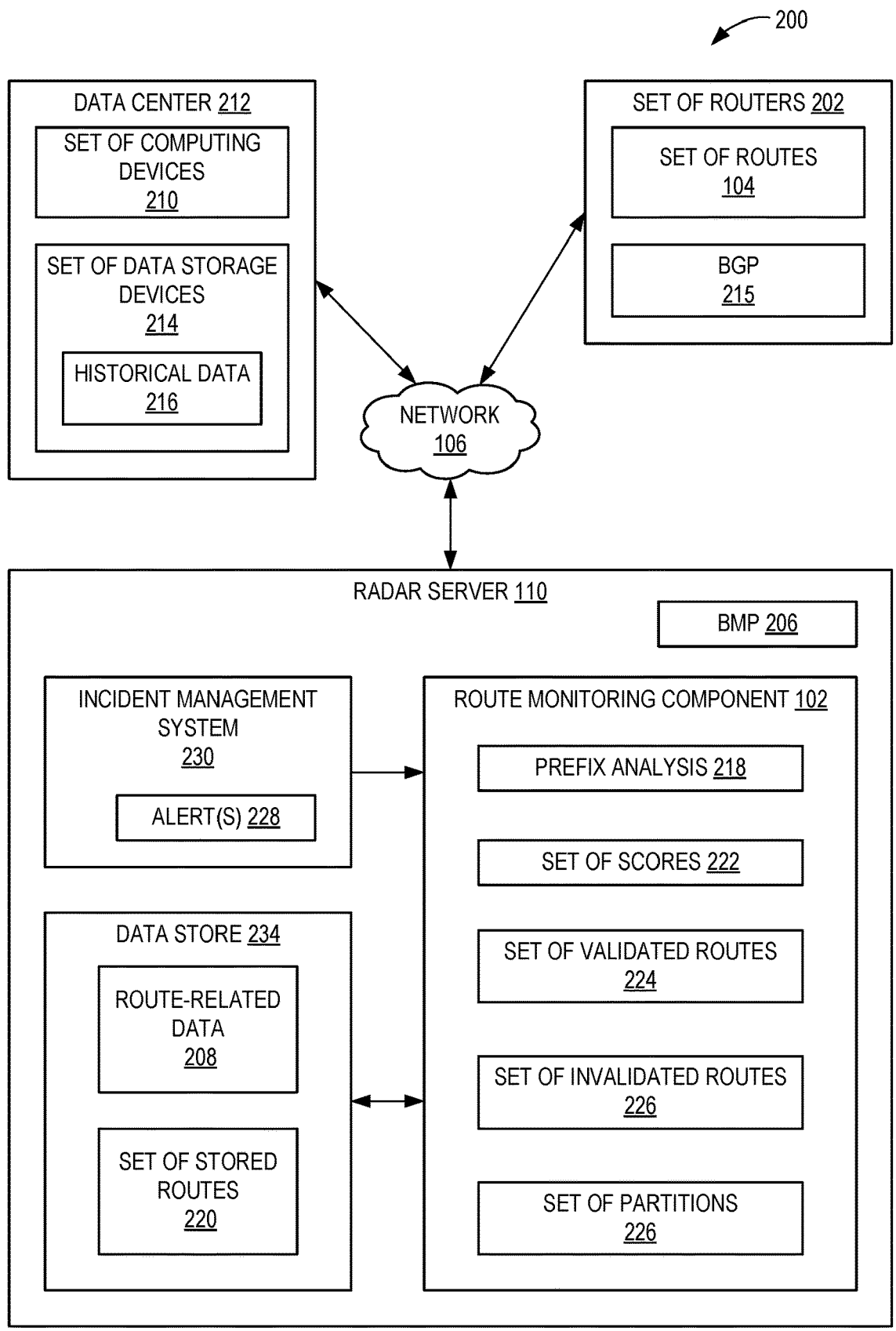
FIG. 2 is an exemplary block diagram illustrating a system including a monitoring component on a RADAR server.

FIG. 2 is an exemplary block diagram illustrating a system 200 including a route monitoring component 102 on a RADAR server 110. The RADAR server 110 can be implemented as a physical computing device or a cloud server associated with a set of one or more physical computing devices, such as a set of computing devices 210 physical servers in a data center 212. A cloud server is a logical server providing services to users or other computing devices. A cloud server is hosted and/or delivered via the network 106. In some non-limiting examples, the cloud server is associated with one or more physical servers in one or more data centers 212. In other examples, the cloud server is associated with a distributed network of servers. When implemented in the cloud server as a SaaS, the RADAR system can provide monitoring of entity/customer prefixes, monitoring Internet prefixes on behalf of users, detecting and/or mitigating prefix hijacking.

The data center 212 can optionally also include a set of one or more data storage devices 214 for storing data, such as, but not limited to historical data 216 associated with one or more routes. A data storage device in the set of data storage devices 214 can include one or more different types of data storage devices, such as, for example, one or more rotating disks drives, one or more solid state drives (SSDs), and/or any other type of data storage device. The set of data storage devices in some non-limiting examples includes a redundant array of independent disks (RAID) array. In other examples, the set of data storage devices includes one or more database, such as a route registry, a record of activity associated with a route, route announcements, route ownership, route withdrawals, or other route-related data 208.

The set of data storage devices 214 in this example is remote from the RADAR server 110. In other examples, one or more of the data storage devices within the set of data storage devices are included within the RADAR server 110, attached to the RADAR server, or otherwise associated with the RADAR server 110. In still other examples, RADAR server 110 is a physical server device within the set of computing devices 210 of the data center 212.

There are three types of prefixes contained in a data center, public IP block (Routable within cloud and internet), private global (routable within cloud services network) and/or private reuse (routable within a region only). In some examples, public and private global prefixes are unique over the entire networking space. The route monitoring component tracks the existence of these prefixes and ensures that they are being advertised from the correct location, and globally reachable from all the other data centers in the network. They should also be globally reachable from the Internet peering routers in the network as well (the "reach out" portion of the network).

Each data center can include a set of non-unique private reuse space that is used internally in each data center. This reuse space is present inside the datacenter; however, leakage externally can result in multiple outages. The route monitoring component monitors for a non-unique set of space inside each data center to ensure that this space is not leaking into the selected network.

In some examples, the route monitoring component 102 receives the set of routes 104 from a set of one or more routers 202 via the network 106 in accordance with BGP 215 and/or BMP 206 on the RADAR server 110, which routes the published routes from the routers back to the RADAR server 110 for anomalous route detection analysis by the route monitoring component 102. An anomalous route can also be referred to as an unhealthy route.

The route monitoring component 102 in some examples includes a set of microservices analysis components for performing prefix analysis 218 on a routing prefix for each received route in the set of routes 104. The route monitoring component 102 receives a set of one or more scores 222 from the set of microservices. Each score in the set of scores is generated by one microservice in the set of microservices analysis components. Each score indicates whether the route analysis results suggest the analyzed route is valid or invalid.

In some examples, if the set of scores 222 indicates a selected route is valid, the route is assigned to a set of validated routes 224. The set of validated routes are stored in the set of stored routes 220 for as long as the routes are active by a partition service. The set of validated routes 224 are approved for utilizing in routing traffic via one or more networks, such as, but not limited to, the network 106.

If the set of scores 222 for a selected route indicates the route is an anomalous route, the selected route is assigned to a set of invalidated routes 226. The set of invalidated routes 226 are also stored in the set of stored routes of the data store 234 associated with the route monitoring component 102. In other words, all routes, including both validated and invalidated routes are stored on the RADAR server 110 in this example. The routes are stored as long as they are active. If a route becomes inactive (withdrawn) it may be removed from the set of stored routes 220 after a threshold wait-time. The threshold wait-time is a user configurable time-period. In some examples, the threshold wait-time is several days. In other examples, the threshold wait-time is thirty days or thirty-one days, or any other configurable time period In some examples, the routes in the set of invalidated routes 226 can be removed from the network if the routes are bad. In yet other examples, the route monitoring component 102 generates one or more alert(s) 228 associated with each route in the set of invalidated routes 226 indicating the invalidated routes are potentially hijacked routes, leaked routes or withdrawn routes. The alert(s) can be sent to an incident management system 230 for remediation or displayed to a user via a user interface device.

If an invalidated (unhealthy) route information is output to a user, the output can include the route, ASN, potential issue (hijacked route, leaked route, withdrawn route, etc.), and/or any other available route-related data. The other route-related data could include suspicious activity associated with the route, ownership of the route, inconsistent publication/announcement of the route on the Internet, etc.

In some examples, the route monitoring component 102 includes a set of partitions 232 for storing received routes within the partitions. In other examples, the route monitoring component 102 sends a selected route for analysis to a set of analysis components within one or more of the partitions in the set of partitions 232. In one non-limiting example, each route collection component has sixteen partitions for collecting IPv4 routes and sixteen partitions for IPv6 routes. Each microservice analyzer has four IPv4 partitions and two IPv6 partitions.

In some examples, the route monitoring component 102 reports that all the public and private global prefixes are available at all routers (DCRs/ICRs/SERs). If Any router is not receiving the prefix, the route monitoring component 102 generates an alert and/or reports it. The route monitoring component 102 can report any reuse block with missing reuse community being learned from a data center/device/session.

In other examples, the route monitoring component 102 reports the delta of prefixes being learned from the different devices, such as, tier 3/route aggregator (T3/RA) from a data center. All the T3/RA in a data center should announce the exact copy of the prefixes. The route monitoring component 102 can report the delta prefixes being advertised by routers to the different devices, such as the T3/RA in a data center. All the routers (DCR/ICRs) in a data center should announce the exact copy of the prefixes. The system can report that all the -public and private global prefixes being advertised by routers (DCRs/ICRs/SERs) via IBGP. If Any router (DCR/ICR/SER) is not advertising a specific prefix expected to advertise, the system should be able to alert/report it. The route monitoring component 102 in other examples maps the global prefixes to the respective data centers/sites.

A routing table can provide the statistics for size of prefixes (count/percentage per size) being advertised by a data center/device/session. The feature will help in ternary content addressable memory (TCAM) device memory management for the network devices. In still other examples, the system 200 can include an interface for services/first party users to define the specific prefixes they want to monitor for advertisement/availability In general, the various components of the system 200 may be implemented on a plurality of computing devices 1200 and/or a cloud resource 1228, which are described in further detail in relation to FIG. 12. Thus, at least some of the operations described herein may be implemented by a processor executing instructions that are stored on a computer-readable medium.

Figure 3:
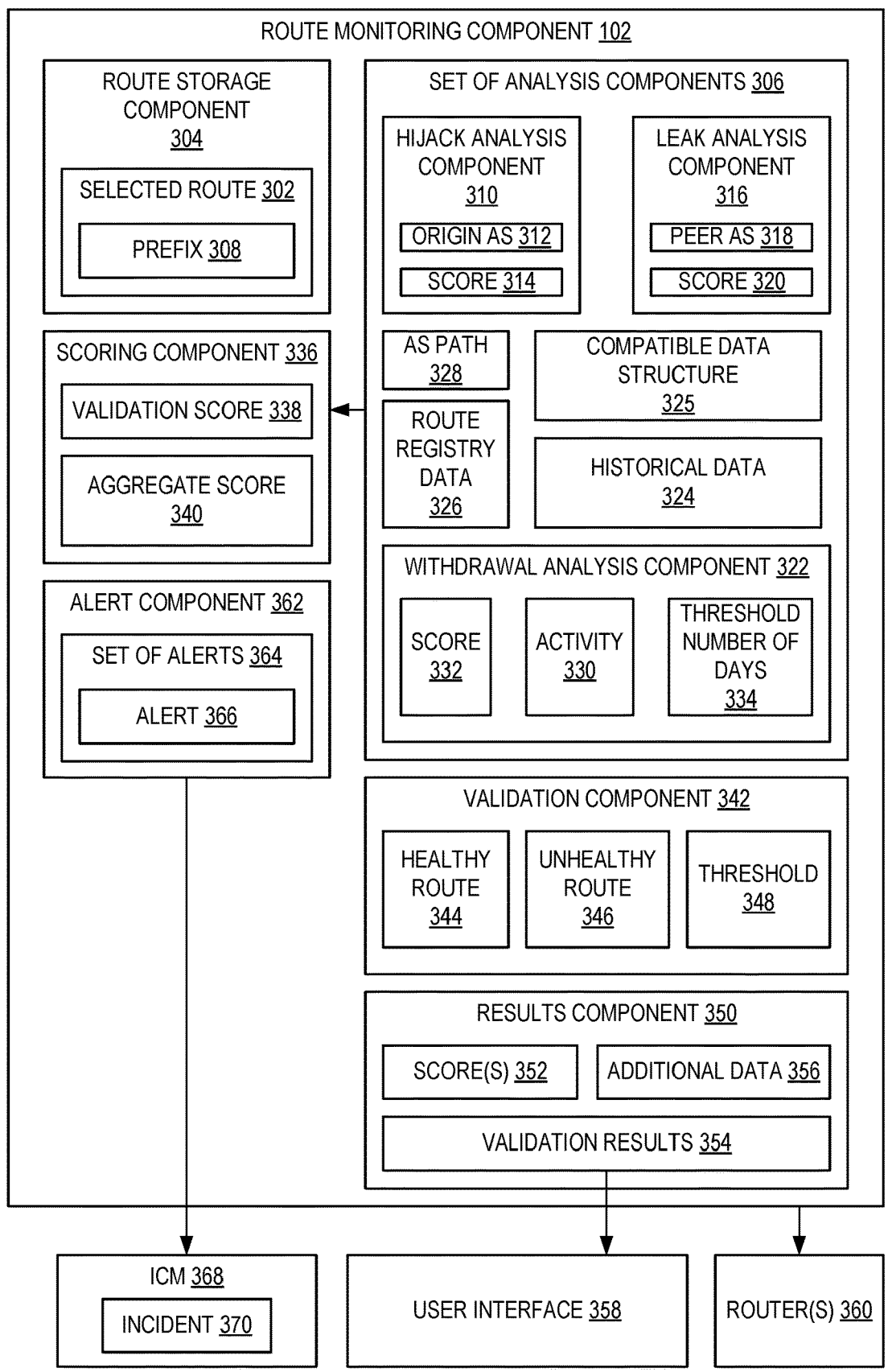
FIG. 3 is an exemplary block diagram illustrating a route monitoring component.

FIG. 3 is an exemplary block diagram illustrating a route monitoring component 102. The route monitoring component 102 receives a selected route 302 at a route storage component 304. The route storage component 304 stores every received route in a data store associated with the route monitoring component 102. The routes can be stored within partitions of the route monitoring component 102 or stored on a data store, such as a database, associated with or accessible by the route monitoring component 102.

In some examples, the route monitoring component 102 performs decoding on the messages, including routes, received from the at least one router device. The decoding parses and converts the route data to a compatible data structure 325 for analysis. In other words, decoding converts the format of the data into a form which is ready for leak detection and hijack detection analysis.

In other examples, the route storage component 304 sends the selected route 302 to a set of analysis components 306. The set of analysis components 306 is a set of microservices the perform anomalous route detection prefix analysis on routing prefix, such as the routing prefix 308.

In some examples, the set of analysis components 306 includes a hijack analysis component 310 which analyzes an origin AS portion of the prefix 308 along with any other relevant data, such as historical data 324, registry data 326, AS path 328 and/or activity 330 data associated with the selected route 302 to generate a score 314. Historical data 324 can include any type of lateral historical data associated with a route, such as historical ownership data, historical publication of the route, activity associated with the route, historical withdrawals of the route, etc. The registry data 326 includes data from ownership registry tables. The registry contains information used to very an owner of a route is registered, determine whether the owner is listed in a database list or record, etc.

AS path 328 is a set of autonomous systems that specifies the path/route covered. In BGP, AS path is present in the prefixes exchanged between BGP neighbors. A BGP router adds its own ASN to the AS path when it sends an update to an external neighbor. In this manner, the AS path for a given prefix lists all the autonomous systems traversed between the origin AS and the peer AS location from which the given prefix is advertised.

The activity 330 data is current or historical activity associated with a route. Activity taken can be obtained from various sources on the Internet or other publicly available data sources, including RIPE, hgp.he.net, etc.

The score 314 generated by the hijack analysis component 312 indicates whether the selected route is likely to be a hijacked route based on the results of the route hijack analysis performed by the hijack analysis component. The score 314 can be referred to as a hijack score, a health score, a route hijack probability score, a hijack detection score, or a hijack assessment score.

In some non-limiting examples, if the route is not a hijacked route, the score 314 is a positive value. If the route may be a hijacked route, the route is assigned a lower number indicating the route is most likely hijacked. The lower number can be a number less than a threshold healthy score. In another example, the hijack score generated by the hijack analysis component can be a negative score. In still other examples, a threshold value is used to determine whether a score indicates a hijacked route. For example, if a route is a good route, the score 314 assigned is a value that falls within a valid score range. Likewise, if the route is a hijacked route, the score 314 assigned to the route is a value within an invalid route threshold range.

A leak analysis component 316 in other examples performs route leak analysis using a peer AS 318 portion of the AS path 328, as well as any other relevant data to generate a score 320. The score 320 can be referred to as a leak score, a leak detection score, a health score, a leaked route probability score, or a route leak assessment score.

The leak analysis component 316, in other examples, can also utilize prefix peer advertisement data obtained from registry data 326 in a public registry table or database, historical data, AS path or other information to determine whether a route is a leaked route. The score 320 indicates whether the selected route 302 is likely to be a leaked route.

In some examples, the leak analysis component 316 looks at add/update of routes from peer capacity perspective. A peer can be divided into four categories. A tier one (T1) peer is a peer which can serve the entire traffic in a geographic region. A tier1 peer can be paid or free but has enough capacity and enough downstream link to carry traffic in case link to active peer serving that prefix is disconnected. Many large ISPs are in T1 category. A tier 2 (T2) peer can serve traffic in a country or small region. A tier 2 peer can be paid or free but has enough capacity and enough downstream link to carry traffic in case a link to active peer serving that prefix is disconnected. Most of the regional ISPs are in T2 category. Large cloud providers and networks exchanging significant traffic are tier 3 (T3) peers. The remaining peers are tier four (T4) peers. The fault alerting system generates alerts based on the severity of the incident. For example, if a route is withdrawn that has between 400 megabytes (MB) of traffic over the last hour, the incident is more severe than a withdrawn route that has less than one hundred MB of traffic over the last hour. The alert generated by the system in some examples includes the amount of traffic, impacted routes and severity of the impact of the withdrawn route.

A withdrawal analysis component 322 analyzes activity 330 associated with the selected route along with other data, such as, but not limited to, registry data, historical data 324, etc. Activity can include announcing a route and then withdrawing it multiple times, announcing it to some but not announcing it to others, failing to announce it consistently to everyone etc.

In some examples, the withdrawal analysis component 322 looks at withdrawal of the routes if an IP address or set of IP addresses does not have reachability from a selected network as result of a route withdrawal event. The withdrawal component can also determine such reachability by looking at multiple reflected copies of the route. The withdrawal analysis component 322 creates an incident in the system to alert for potential network outage. The severity of the incident is dependent on amount the traffic that prefix block is serving in the time-period, such as seconds, minutes or hours, leading up to withdrawal.

The withdrawal analysis component 322 assigns a score 332 to the selected route 302 based on results of the route withdrawn analysis. In some examples, if the score(s) assigned to the selected route 302 indicates the route is a withdrawn route, the route is stored for a threshold number of days 334 prior to removing the route from the set of stored routes due to route inactivity. In a non-limiting example, the route monitoring component does not withdraw the routes for thirty days. When a route is identified or classified as withdrawn, the route monitoring component marks the selected route as withdrawn to keep all properties of that route. Alerting on the withdrawals can help detect and counteract/prevent unreachable routes. Alerting helps to assure delivery of data packets inside a network.

A scoring component 336 analyzes the set of scores generated by the set of analysis components 306 to generate a validation score 338 for the selected route. In some examples, the scoring component 336 scores routes received from other entities on the Internet to ensure only the best routes are selected/validated and all anomaly/malicious routing activities are detected in Realtime. The scoring component 336 can receive additional signals as input from the Internet route registration organizations (e.g. ARIN, RIPE, etc.), Internet routing registries (e.g. RADB, LEVEL3, etc.), and also internal inputs such as large data sets of route history, business logic (e.g. large cloud providers/carriers from anyone other than themselves), geo-location IP databases, and the Map of the Internet (MOI) telemetry received from clients on the network.

In another example, the route monitoring component 102 monitors the advertisement of prefixes for an entity and its customer prefixes on the internet at per BGP session level. Any withdrawal of a prefix would be supported for alerting. The route monitoring component 102 scores the prefixes based on its stability and performance (Traffic/MOI) learned from Internet. The route monitoring component 102 score the prefixes based on its stability and performance (Traffic/MOI) learned from Internet. The scoring component scores the ASNs based on historical data for malicious activities.

The set of scores in this example includes the score 314 generated by the hijack analysis component 310, the score 320 generated by the leak analysis component 316 and the score 332 generated by the withdrawal analysis component 322. Not every analyzer in the set of analyzers analyzes every prefix. If a route doesn't implicate a service (i.e. there is no withdrawal) then that microservice does not analyze or generate a score for the prefix. In these examples, there may be fewer scores generated than analyzer components even if every analyzer component generates a separate score. In other words, if an analyzer component is not needed for a particular prefix, a score is not provided by that analyzer component.

Thus, the set of scores used to generate the validation score may only include a single score, two scores, as well as three or more scores generated by the set of microservices analyzer components. In an example, the set of scores used to create the validation score may only include one score generated by one analysis component or two scores generated by two analysis components in the set of analysis components.

In other examples, the validation score 338 is an aggregate score 340 generated by a summation of all scores in the set of scores generated by the set of analysis components 306. If the set of analysis components generates three individual scores for the route, the validation score is an aggregation of those three scores. Likewise, if the set of scores includes two scores, the validation score is an aggregation of both of the two scores.

The validation score 338 is a final score indicating whether a selected route is a healthy route 344 or an unhealthy route 346. A healthy route 344 is a route which does not appear to be anomalous. A healthy route has passed the anomalous detection analysis and is ready for utilization by the network. An unhealthy route can include a hijacked route, a leaked route, a withdrawn route or other anomalous route which may cause outages or other issues if the route is used on the network.

A validation component 342 compares the validation score 338 to a threshold 348 or another criteria/rule to determine whether the selected route is a healthy route 344 or an unhealthy route 346. If the route is a healthy route 344, the validated route(s) can be sent to the router(s) 360 for utilization in routing network traffic, such as sending data packets. If the route is an unhealthy route 346, a set of one or more alerts 364 can be sent by an alert component 362 to alert an incident manager (IcM) or other authorized user/administrator with regard to the invalid route. In some examples, an alert 366 identifying the anomalous route is sent to the IcM as an incident 370 for remediation. The alert 364 can include an identification of the selected route 302, the score(s) 352, validation results 354 and/or additional data 356 to assist troubleshooters in preventing any problems associated with the anomalous route.

In still other examples, validation results 354 can be sent to a user interface 358 device in response to a user query regarding the analysis of the selected route. The validation results 354 are sent to the user interface for viewing/display to the user along with any other relevant information such as, but not limited to, an identification of the selected route 302, the score(s) 352, validation results 354 and/or additional data 356 to assist troubleshooters in preventing any problems associated with the anomalous route.

In some examples, the route monitoring component provides an AS connectivity map worldwide and the relationship amongst them. This localizes/geolocates any prefixes, as well as the location/region/site from which the prefix is hijacked. The system marks all the edge locations/vantage points where the prefix hijack is detected.

Figure 4:
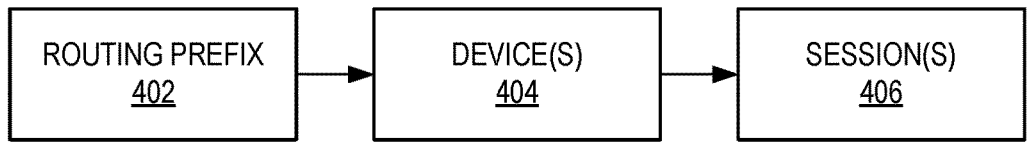
FIG. 4 is an exemplary block diagram illustrating a routing prefix.

FIG. 4 is an exemplary block diagram illustrating a routing prefix. The routing prefix 402 is a block of IP addresses within an AS, such as, but not limited to, the prefix 308 in FIG. 3. The route monitoring component in some examples is a partitioned stateful service which stores all the routes. A copy of each route can be uniquely identified through a routing prefix.

There is separate route collection component for analysis of Internet Protocol version 4 (IPv4) routes and Internet Protocol version 6 (IPv6) routes. In full production systems, thirty-two partitions are provided for the IPv4 routes and sixteen partitions are provided for the IPv6 routes. The number of partitions can be reconfigured based on the number of routers received and processed as the system evolves.

The route monitoring component uses reliable collection keyed on the routing prefix 402. Each routing prefix 402 contains a map of device(s) 404, including device name that has seen the routing advertisement associated with each routing prefix 402. Each device has list of peering session(s) 406 associated with the routing prefix 402. All create, read, update and delete (CRUD) operations are provided via representational state transfer (REST) application programming interface (API) for individual sessions. CRUD includes basic function of computer programming/application functionality.

Figure 5:
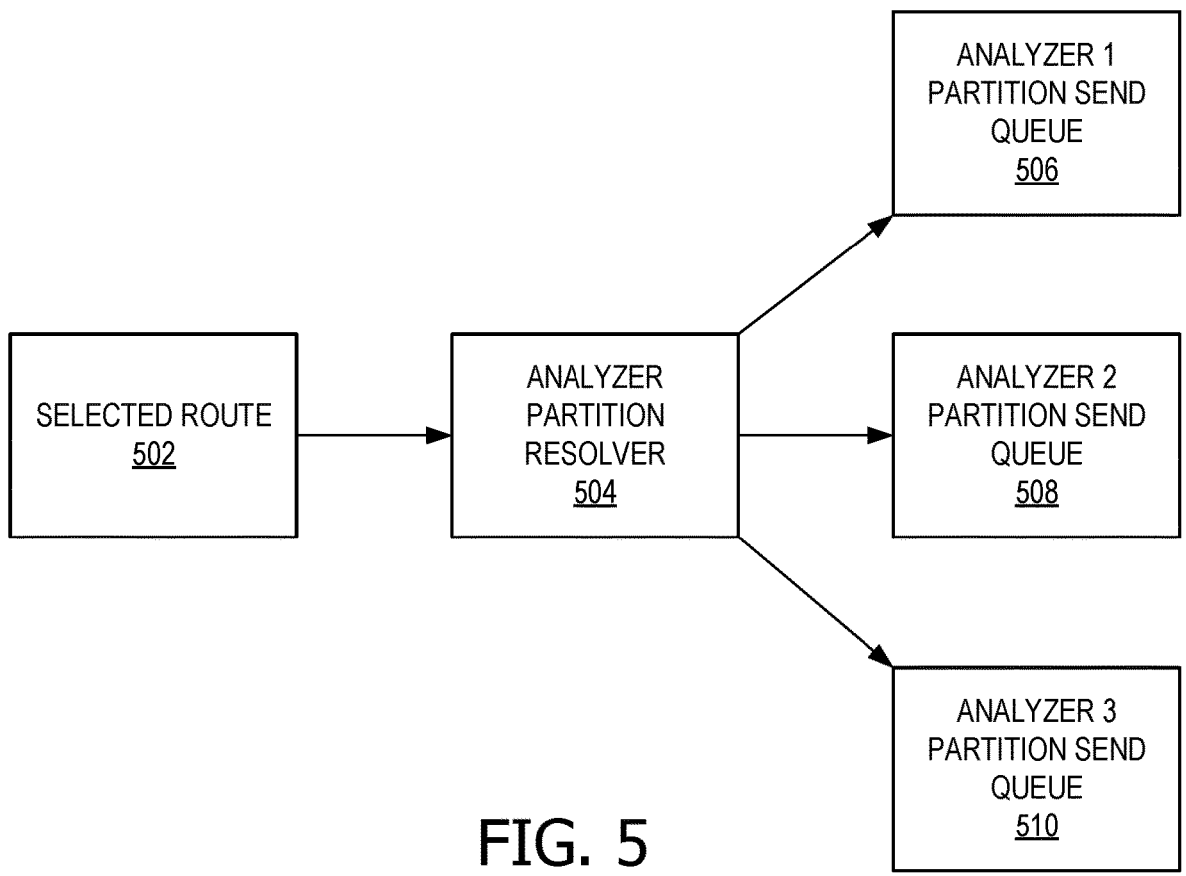
FIG. 5 is an exemplary block diagram illustrating sending a selected route to a set of analysis components for anomalous route detection.

FIG. 5 is an exemplary block diagram illustrating sending a selected route 502 to a set of analysis components for anomalous route detection. The set of analysis components is a set of one or more microservices for analyzing a selected route, such as, but not limited to, the set of analysis components 306 in FIG. 3. In this example, the route monitoring component includes a route analyzer gateway which is a stateless service for receiving the routes from the collector, such as the route collection component 112 in FIG. 1. The route monitoring component sends/broadcasts the selected route 502 to all route analyzers in the set of route analysis components.

In some examples, an analyzer partition resolver 504 sends the selected route 502 to a first analysis component (analyzer 1) partition send queue 506, a second analysis component (analyzer 2) partition send queue 508 and a third analysis component (analyzer 3) partition send queue 510. The first analysis component can be a hijack analysis component. The second analysis component can be, without limitation, a leak analysis component. The third analysis component can be, without limitation, a withdrawal analysis component.

Figure 6:
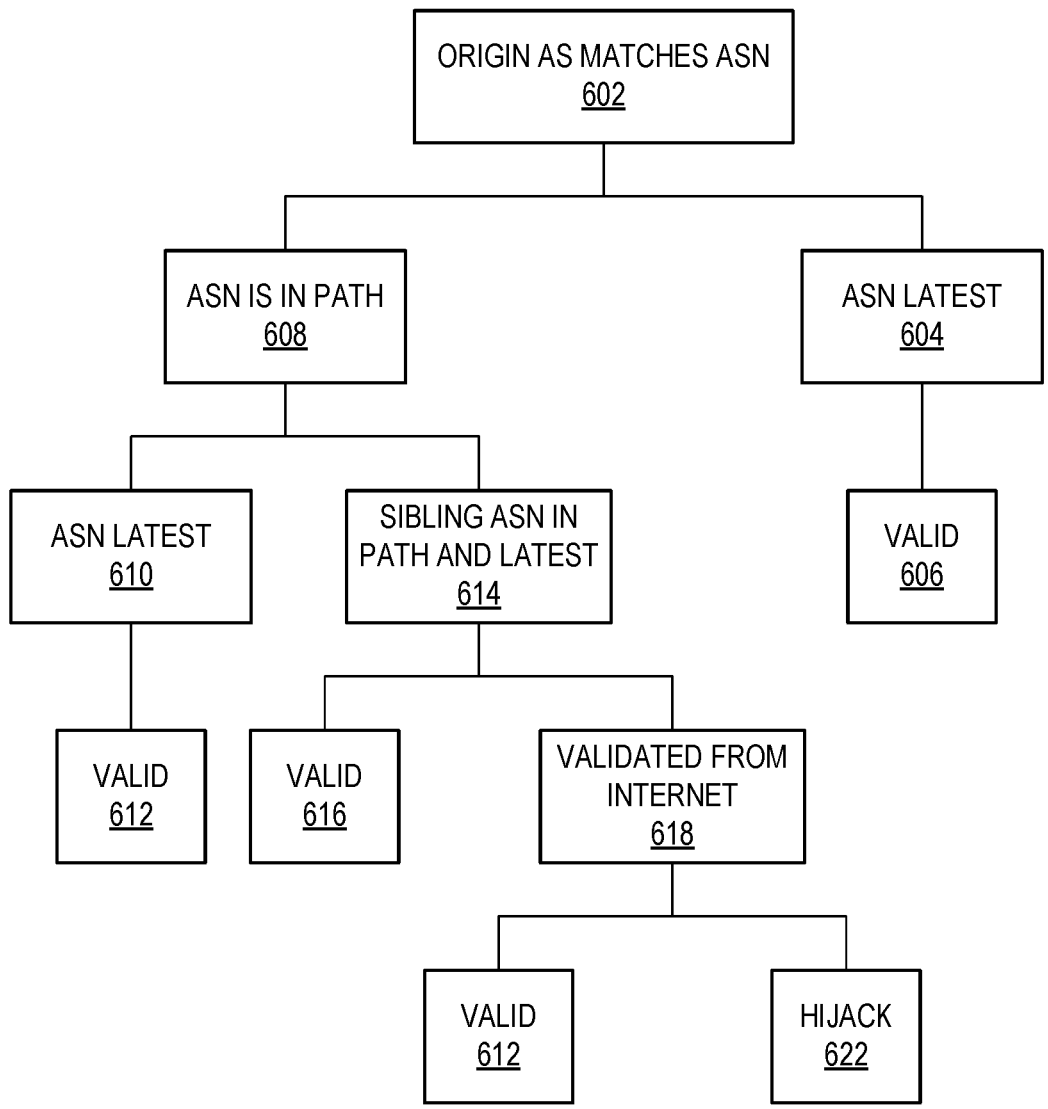
FIG. 6 is exemplary block diagram illustrating a route hijack analysis of a routing prefix.

FIG. 6 is exemplary block diagram illustrating a route hijack analysis of a routing prefix. The route hijack analysis can be performed by a hijack analysis microservice component within a set of analysis components, such as, but not limited to, the hijack analysis component 310 in FIG. 3.

The route hijack analysis component analyzes the origin AS of the routing prefix for route advertisement. It uses data from one or more Internet registries to validate whether the origin AS for a prefix is correct or incorrect. The system constantly updates and scrubs old origin AS database to look for new updated origin data for a prefix.

In this non-limiting example, the route hijack analysis component analyzes the origin AS to determine if it matches ASN registry data at 602. If yes, the hijack analysis component determines if the ASN is the latest (up to date) at 604. If yes, the prefix is valid. If the origin ASN does not match the ASN, the hijack analysis component checks whether the ASN is in the path at 608. If yes, the hijack analysis component determines whether the ASN is latest (up to date) at 610. If yes, the prefix is valid under the route hijack detection analysis. Although the route is valid under the route detection analysis, in other examples, the route may be invalidated based on leak detection analysis, withdrawn route detection analysis or other criteria.

If the ASN is not in the path of the selected route, the hijack analysis component determines if a sibling ASN is in the path and the latest (up to date) origin/ownership data at 614. This applies because the sibling AS still belongs to the same organization/entity. If yes, the selected route is valid at 616. If no, the hijack analysis component determines if the selected route origin/ownership can be validated from information on the Internet at 618. If yes, the selected route prefix is valid at 620. If no, the selected route is held onto and further tested if cues from the country or continent of origin for the prefix and the AS can help establish a validation relationship, otherwise the selected route is identified as a hijacked route or a potentially hijacked route at 622.

Figure 7:
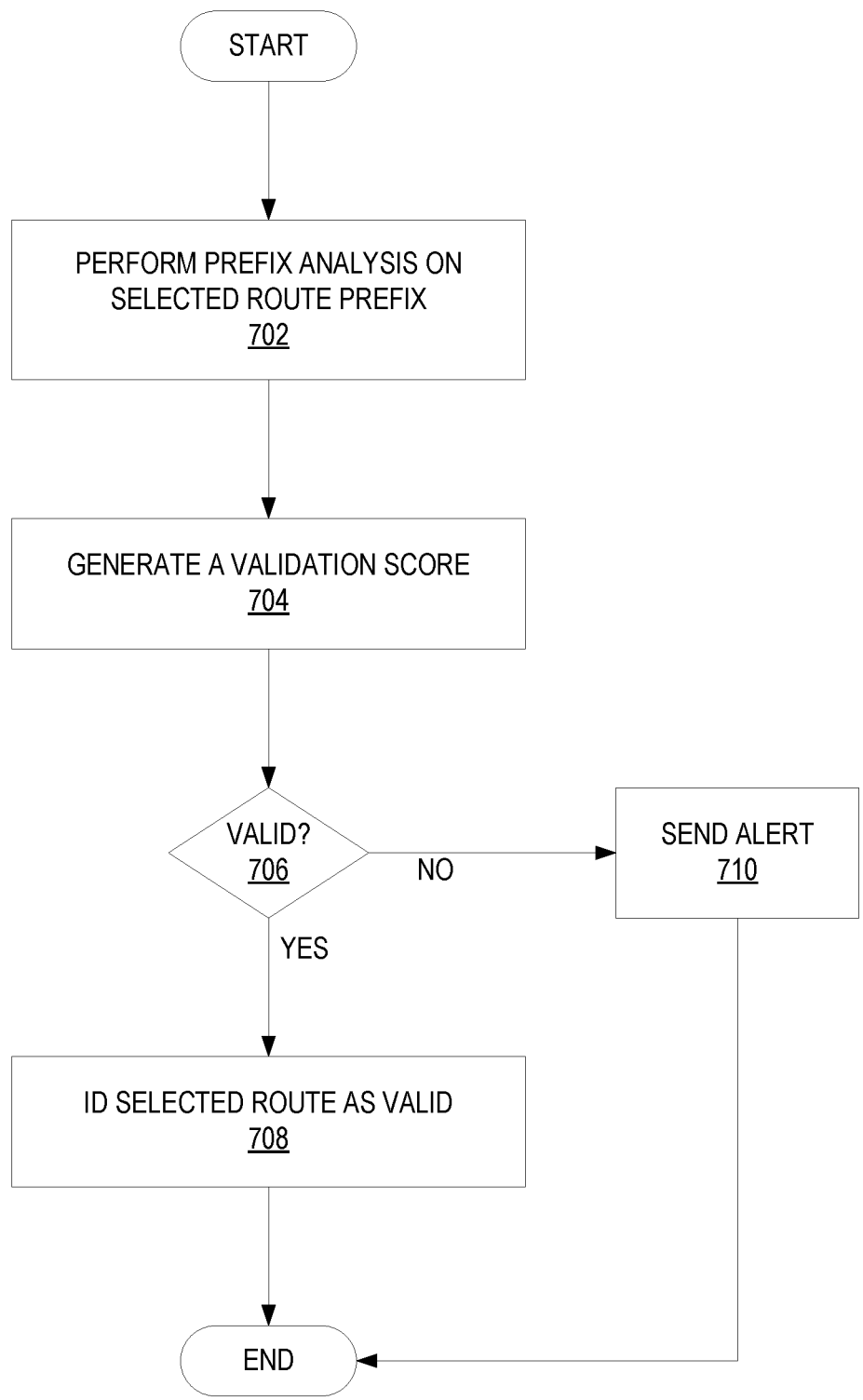
FIG. 7 is an exemplary flow chart illustrating operation of the computing device to perform prefix analysis on a selected route prefix.

FIG. 7 is an exemplary flow chart illustrating operation of the computing device to perform prefix analysis on a selected route prefix. The process shown in FIG. 7 is performed by a route monitoring component, executing on a server, such as the RADAR server 110 in FIG. 1 and FIG. 2. In some examples, operations described for flow chart 400 are performed by computing device 1200 of FIG. 12.

The process begins by performing a prefix analysis on a selected route prefix at 702. The route monitoring component generates a validation score at 704. The validation score is generated based on the set of scores generated by the set of analysis components. The validation score is a score such as, but not limited to, the validation score 338 in FIG. 3. The route monitoring component determines if the score indicates the route is valid at 706. If yes, the route monitoring component identifies a selected route as valid at 708. The process terminates thereafter.

If the score indicates the route is not valid at 706, the route monitoring component sends an alert at 710. The alert can be an incident ticket sent to IcM or a route validation report sent to a user for review and/or remediation. The process terminates thereafter.

Figure 8:
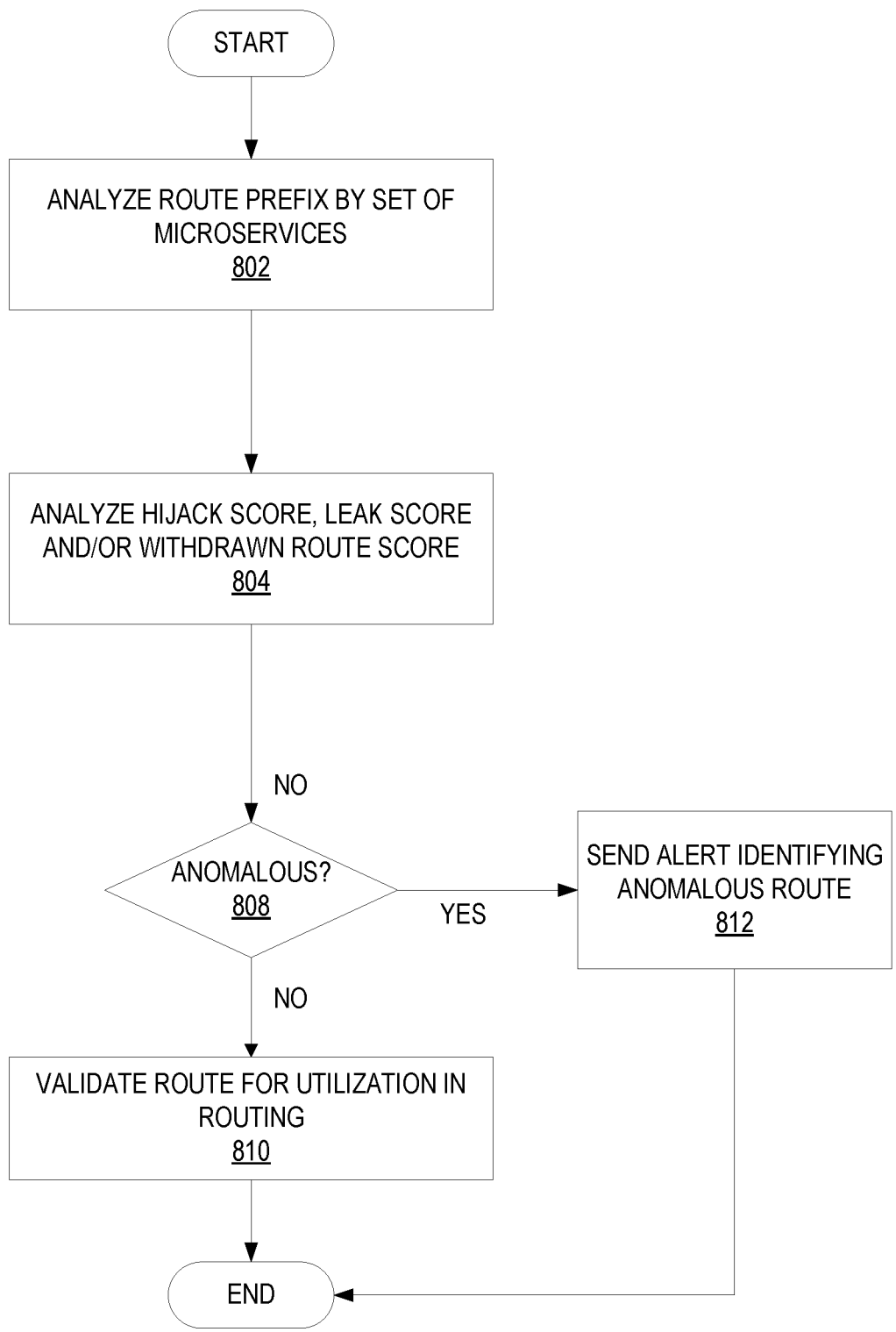
FIG. 8 is an exemplary flow chart illustrating operation of the computing device to analyze a routing prefix by a set of analyzer components.

FIG. 8 is an exemplary flow chart illustrating operation of the computing device to analyze a routing prefix by a set of analyzer components. The process shown in FIG. 8 is performed by a route monitoring component, executing on a server, such as the RADAR server 110 in FIG. 1 and FIG. 2. In some examples, operations described for flow chart 400 are performed by computing device 1200 of FIG. 12.

The process begins by analyzing a route prefix by a set of microservices at 802. The set of microservices include route hijack detection, route leak detection and/or route withdrawn detection. The set of microservices can include one or more analysis components, such as, but not limited to, the set of analysis components 306 in FIG. 3. The route monitoring component analyzes the hijack score, leak score and/or withdrawal score generated by the set of microservice analysis components in parallel at 804. The route monitoring component determines, based on results of the analysis of the scores, if the route is an anomalous at 808. An anomalous route is a route that is likely to be a hijacked route, leaked route or withdrawn route based on the score(s). If no, the route is validated for utilization in routing at 810. The process terminates thereafter.

If the route monitoring component determines the route is an anomalous route (hijacked route, a leaked route, or a withdrawn route), at 808 the route monitoring component generates one or more alerts identifying the route as an anomalous route at 812. The process terminates thereafter.

In this example, the hijack detection analysis, leak detection analysis and withdrawn route detection analysis are all performed in parallel. The results of the hijack analysis, leak analysis and withdrawn route analysis are considered together when determining whether to generate an alert associated with an anomalous route. In other examples, one or more of the microservice analysis component may not analyze the prefix or generate a score if the analysis is not indicated. For example, if withdrawal of the route is not in question, the withdrawal detection analysis is not performed with the hijack analysis and a withdrawal score is not generated for the prefix by the withdrawal analysis component.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

Figure 9:
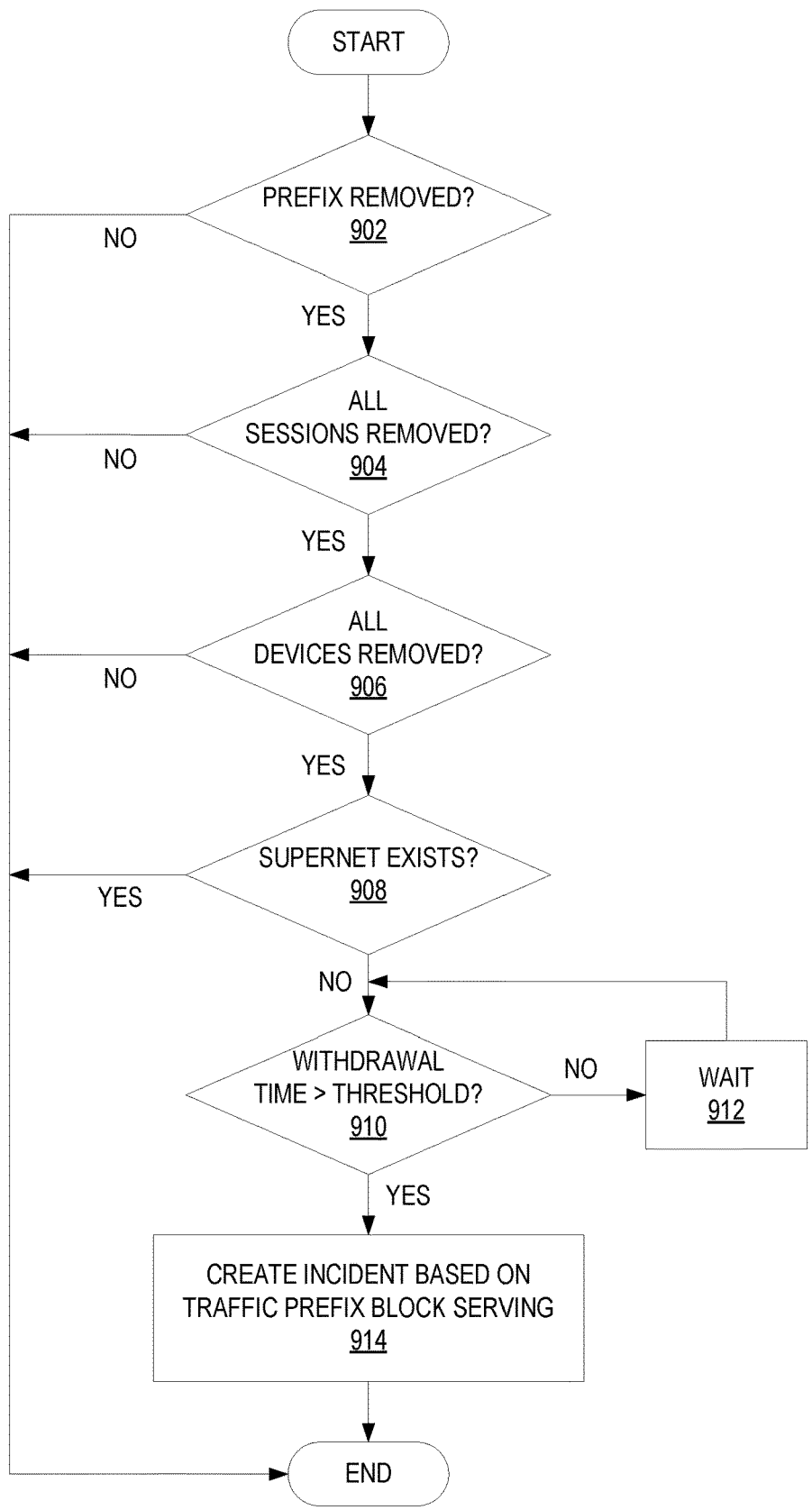
FIG. 9 is an exemplary flow chart illustrating operation of the computing device to identify a withdrawn route.

FIG. 9 is an exemplary flow chart illustrating operation of the computing device to identify a withdrawn route. The process shown in FIG. 9 is performed by a route monitoring component, executing on a server, such as the RADAR server 110 in FIG. 1 and FIG. 2. In some examples, operations described for flow chart 400 are performed by computing device 1200 of FIG. 12.

The process begins by determining if a prefix is removed at 902. If yes, the route monitoring component determines if all peering sessions for the router(s) that have seen the routing advertisement are removed at 904. If yes, the route monitoring component determines if all devices that have seen the routing advertisement are removed at 906. If yes, the route monitoring component determines if a supernet exists. A supernet is created by combining multiple IP networks or subnets into a single network with a single routing prefix. If the prefix is not associated with a supernet, the route monitoring component determines if the withdrawal time threshold has expired (withdrawal time exceeds threshold) at 910. The wait time prevents removal of routes experiencing a transient/temporary withdrawal or unavailability as opposed to a more long-term unavailability or permanent withdrawal. If no, the route monitoring component waits at 912 until the withdrawal time is exceeded. The route monitoring component creates an incident based on traffic served by the prefix block at 914. The process terminates thereafter.

While the operations illustrated in FIG. 9 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 9.

Figure 10:
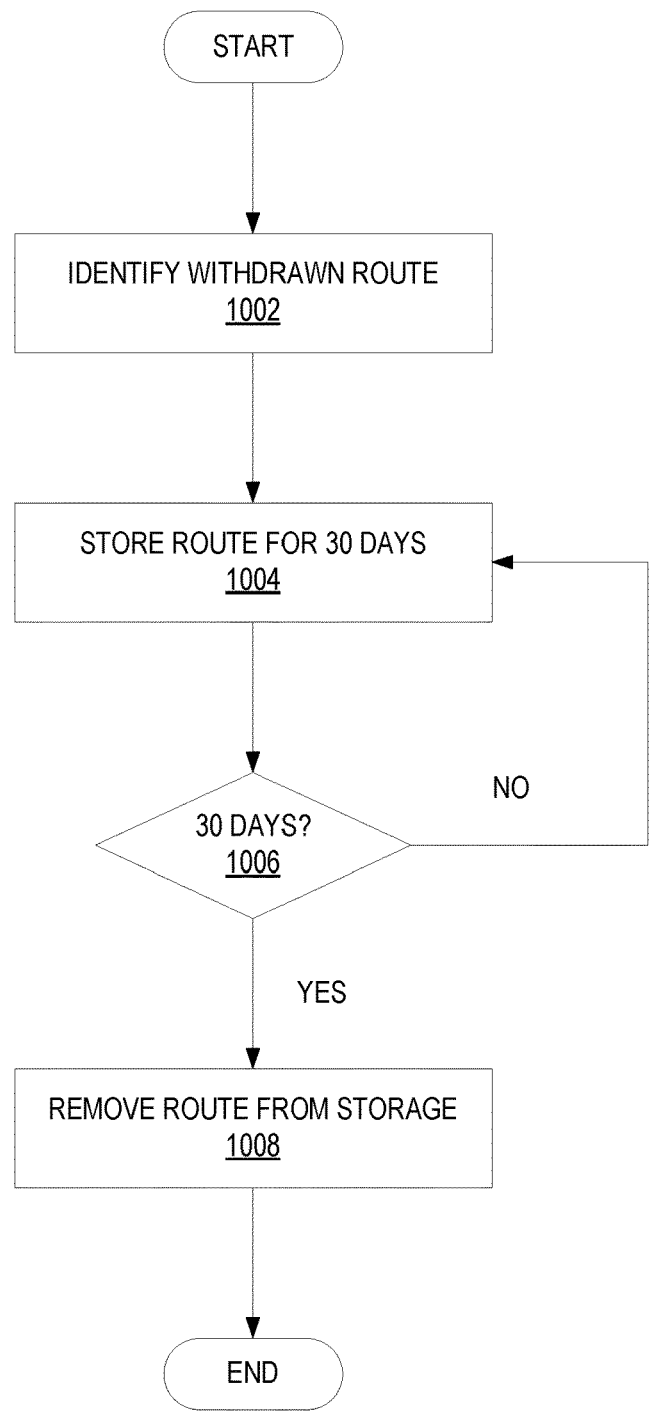
FIG. 10 is an exemplary flow chart illustrating operation of the computing device to remove a withdrawn route.

FIG. 10 is an exemplary flow chart illustrating operation of the computing device to remove a withdrawn route. The process shown in FIG. 10 is performed by a route monitoring component, executing on a server, such as the RADAR server 110 in FIG. 1 and FIG. 2. In some examples, operations described for flow chart 400 are performed by computing device 1200 of FIG. 12.

The process begins by identifying a withdrawn route at 1002. The route monitoring component stores the route for thirty days at 1004. In this example, the thirty days is a threshold wait time-period prior to removing the route from the set of stored routes on the route monitoring component. The route monitoring component determines if the thirty days is expired at 1006. If the thirty days have passed, the route monitoring component removes the route from the storage at 1008. The process terminates thereafter.

While the operations illustrated in FIG. 10 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 10.

Figure 11:
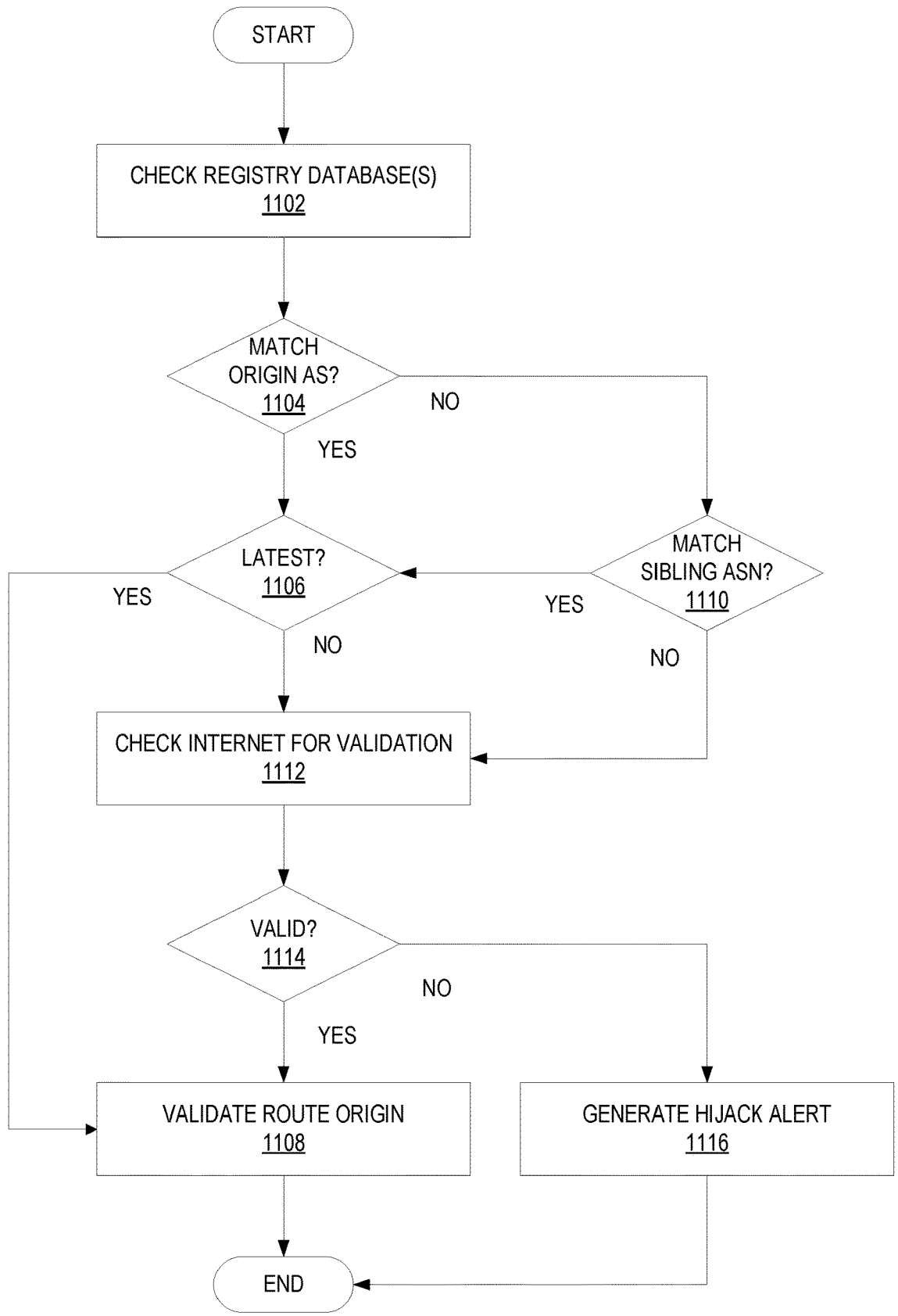
FIG. 11 is an exemplary flow chart illustrating operation of the computing device to generate a hijack alert.

FIG. 11 is an exemplary flow chart illustrating operation of the computing device to generate a hijack alert. The process shown in FIG. 11 is performed by a route monitoring component, executing on a server, such as the RADAR server 110 in FIG. 1 and FIG. 2. In some examples, operations described for flow chart 400 are performed by computing device 1200 of FIG. 12.

The process begins by checking registry database(s) at 1102. The registry databases are checked to obtain ownership information and other data associated with the routing prefix. The route monitoring component determines if the origin AS portion of the routing prefix matches an ASN in the registry database(s) at 1104. If yes, the route monitoring component determines if the origin information is the latest/most recent up to date information available at 1106. If yes, the route monitoring component validates the route origin at 1108. The process terminates thereafter.

If the origin AS does not match the information in the registry, the route monitoring component determines if a sibling ASN matches the origin AS at 1110. If yes, the route monitoring component determines if the origin information is the latest/most recent up to date information available at 1106. If yes, the route monitoring component validates the route origin at 1108. The process terminates thereafter.

If the sibling ASN does not match at 1110, the route monitoring component checks the internet for validation of the route prefix at 1112. The route monitoring component determines if the prefix is valid based on the internet validation at 1114. If yes, the route monitoring component validates the route origin at 1108. The process terminates thereafter.

If the internet validation does not validate the route prefix, the route monitoring component generates a hijack alert at 1116. In some examples, further analysis can be made if the route and the ASN have been historically and consistently associated with the same continent or country, in which case the route can still be validated, or the route monitoring component generates the hijack alert at 1116. The process terminates thereafter.

While the operations illustrated in FIG. 11 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 11.

The Border Gateway Protocol (BGP) for distribution of routes between autonomous systems (AS) was developed to provide a stable, highly distributed method of route synchronization in Internet networks. The BGP protocol has been adopted in modern cloud network designs to perform a similar function.

RADAR system is designed to monitor routing plane in a proprietary cloud network. This system can detect regular routing events such as complete withdrawal of a route in the proprietary cloud network, as well as routing anomalies such as BGP Hijack and Leaks. It also allows for querying centralized information regarding any prefix to which packets are routed from or received by the proprietary cloud network.

To achieve this, RADAR uses BGP Monitoring Protocol (BMP) to access the contents of a router's Routing Information Bases (RIBs).

In some examples, the overall architecture of RADAR, includes a BMP listener that collects RIBs from routers and delivers this information to RADAR's front-end service. The RADAR front-end service acts as a gateway to other radar services. The route collector component of radar manages RIBs and constantly provides the status of routing table across the proprietary cloud network. The route analyzer component detects routing anomalies. The BGP speaker component of RADAR allows updating the routing information in the routers to counteract various scenarios and mitigate issues detected.

In other examples, the BMP listener component of radar is implemented as a continuously running service in the proprietary service management system, aka Autopilot. This service uses the concepts of BMP listening to continuously listen to BMP messages from the router. The BMP listener service is deployed with instances that are geographically distributed with each instance serving the routers in its vicinity. Upon receipt of these BMP messages from the routers, the BMP listener uses a Representational State Transfer (RESTful) API to send this information to RADAR. More specifically, the following information is included in the messages sent to RADAR's front-end service: the route prefix, next hop, AS path, local preference, MED, route communities, router IP and name, peer IP, name, and AS number, local IP and AS number, route target and distinguisher, the received timestamp of the route, and a flag specifying whether the route is withdrawn (in which case a number of the above attributes may be meaningless and are not be included in the message sent to RADAR).

In some examples, the RADAR components may be implemented as distributed systems using a proprietary service fabric and on top of the Autopilot servers within the proprietary network. service fabric allows creating stateless services with multiple instances so that requests can be served at higher capacity, as well as creation of stateful services where data can be partitioned and each partition can be served by a primary instance backed up by a number of secondary instances allowing resiliency to any issues that may result in shutting down of the primary instance.

Additionally, service fabric allows RADAR to persist valuable data so that as service go up, down and go through upgrades, routing data is preserved.

The RADAR frontend in other examples is a stateless service implemented on top of the proprietary service fabric. This service is run in a handful of geographically distinct regions. It serves several routers that are in the vicinity of each region through the corresponding instances of RADAR front-end in that instance. BMP listener uses an anycast Virtual IP address (VIP) that can be served by any of the front-end instances in any of the geo-locations that it is running. Each instance of the front-end service knowns through its configuration the list of routers that it is responsible to serve. If the received route is from any of the served routers, the front-end analysis processes the route and send it to the Route Collector. Otherwise, it finds the correct instance of the RADAR front-end and makes another RESTful http request to send the routes to the correct instance. The front-end sends the routing information to the route collector unless the route is not valid. This can happen if the route is having a pre-policy tag from the router, and/if the some of the routing information do not match, e.g. the route prefix is invalid, etc.

The route collector in other non-limiting examples is implemented as a stateful service on top of the proprietary service fabric. It processes routes in thirty-two partitions for IP version 4 (IPv4) and 16 for version 6 (IPv6). These partitions are mapped based on the first four bits of the binary representation of the network address of the route prefix1. This partitioning prefixes allows for better access and lookup of supernet and subnets of a specific network which is crucial to the analysis of theses prefixes within the RADAR system.

Similar to RADAR front-end, there are instances of route collector in various geographic regions. Each instance has 32 partitions, including sixteen partitions for IPv4 and sixteen partitions for IPv6 as described above. Once the routing information arrives at the correct radar front-end instance, they are forwarded to the instance of the route collector in the same geographic area using the inter-service communication mechanisms of service fabric. The route collector then organizes this routing information in a nested map which is keyed by the route prefix at the first level. The route collector maintains a list of routers that have sent routing information for this prefix to the current instance of the route collector; hence route names create the second level of nesting in the internal map.

In some examples, there is a third level of nesting under each device keyed by the peer IP address that identifies a session for that router. Under the sessions, the route collector maintains the routing attributes like received timestamp, local preference, MED, etc. then. Since each route within the proprietary network can be uniquely identified by the tuple of route prefix, device name, peer IP, also be referred to as route ID; this organization of the routing data allows quick access to the details of each route once the corresponding route ID is identified. It also allows to easily collect information regarding a specific route prefix for all or specific devices or sessions. This information is further persisted using the mechanism provided by service fabric. This allows the routing information to be preserved as instances of route collector are upgraded. This also allows the stateful mechanism of service fabric application management to designate and change instances of the route collector from being primary or secondary instance for each partition without loss of data. As a result of these mechanisms, the route collector preserves the latest information on each route that has been learned within the proprietary network no matter how long ago the route has been learned.

The route collector in other examples, gathers all the above routing information and exposes them both through a RESTful API that allows various hypertext transfer protocol (HTTP) GET actions to inquire about status of a specific prefix or route ID. It also provides various summarizations of routing information sent to data explorer databases in the form of an hourly map of the full routing table across the whole proprietary network. This allows an end user to query for the routes and their attributes centrally and perform any analysis on them.

The route collector, in other examples, can also detect when a route is completely withdrawn from all of the routers that had previously learned it across the proprietary network allowing us to build alerting for any route withdrawals that can impact the routing plane across the Network. The route collector also sends routes for further analysis to the route analyzer.

The Route analyzer component of RADAR is responsible for detecting anomalies in the received routes. We use this detection alongside further alerting and monitoring pipelines to detect and counteract malicious activities and human mistakes that can impact the proprietary Network.

The first component of route analyzer in some non-limiting examples is route hijack analyzer. This component detects BGP Hijacks. The route hijack analyzer in these examples is also partitioned similar to the route collector, but with only four partitions for IPv4 and two for IPv6 prefixes. The analyzer is also a stateful service on top of the proprietary service fabric with the ability to persist and preserve the analysis results on the prefixes.

BGP hijacking (sometimes referred to as prefix hijacking, route hijacking or IP hijacking) is the illegitimate takeover of groups of IP addresses by corrupting Internet routing tables maintained using BGP. This can occur deliberately or by accident in one of several ways, e.g. an AS can announce that it originates a prefix that it does not actually originate, or an AS can announce a more specific prefix than what may be announced by the true originating AS, or an AS can announce that it can route traffic to the hijacked AS through a shorter route than is already available, regardless of whether the route actually exists.

To detect a BGP hijack, the route hijack analyzer focuses on the relationship between the received route and its Origin AS, defined as the last AS number (ASN) in the AS path associated with the route. This is the ASN that allegedly has originated this route. Route hijack analyzer processes the prefixes that receives from the route collector in tandem queues. Each time routes and their details are placed in a queue and they are processed. If evidence of a BGP hijack is found, these routes are tagged as a hijack and returned to the route collector, otherwise they are sent to the next queue for another validation. Route hijack analyzer also uses a scoring system, in which each route prefix is given a score between 0-100 with 0 meaning that a BGP hijack has happened with high confidence and one hundred (100) meaning that the route is verified with a very low chance of hijack happening on it. Next, we describe the processing that is done in these tandem queues in the route hijack analyzer.

In an example, the route hijack analyzer checks against an internal database of associations between route prefixes and origin AS values. If the association is found, the route prefix is cleared and returned to route collector with a score of 100. Next, anchoring is considered. Anchoring considers that the originator might have its trusted origin AS not at the head of the AS Path but somewhere among the first few Autonomous Systems that have passed the route. Hence, if a trusted AS is found at a distance "I" from the origin AS, a score of 100-10*I is assigned to the route and it is returned to the Route Collector. The system determines if the origin or anchor AS is a sibling of a trusted AS. Sibling AS belong to the same organization and hence is trusted similarly, i.e. if an AS A is trusted to own prefix P, its sibling AS is also trusted on the same level. The system determines if a supernet of the prefix is known to belong to the AS or its sibling or have an anchor AS path for the supernet. In all these cases, the route is also cleared and given a score of 100 (100−10*I in case of anchoring) and returned to the Route Collector.

The next queue of route hijack analyzer does similar checks but using external databases. In some examples, it uses Cisco's BGPMon and the Réseaux IP Européens (RIPE) databases for prefix and origin AS associations. If any association for the route through exact match, or anchor or sibling, or supernet is found, the route is similarly scored and returned otherwise the route goes to the next queue for further processing.

The third queue considers the country of origin of the route and the origin AS. If both are from the same country, a weak score of 10 is assigned but the route is cleared and returned to the Route Collector. Otherwise, it is sent to last queue.

The last queue holds on to the routes that are having mismatching country for the prefix and the origin AS. If these routes are not withdrawn within a day, they are given a weak score of 10 and returned to the Route Collector. If they are, however, withdrawn, then a hijack is declared.

The second component of the Route analyzer is the Route Leak Analyzer. This component is also partitioned similar to the route collector, but with only four partitions for IPv4 and two for IPv6 prefixes. It is a stateful service on top of the proprietary service fabric with the ability to persist and preserve the analysis results on the prefixes.

Route Leak Analyzer focuses on the leak events that is defined as the propagation of routing announcement(s) beyond their intended scope. That is, an announcement from an AS of a learned BGP route to another AS is in violation of the intended policies of the receiver, the sender, and/or one of the ASes along the preceding AS path. The Leak Analyzer of RADAR focuses on the relationship between Peer ASN, which is the last AS in the AS path from which the path is learnt with the prefix.

The system checks or determines if the route is learned from a direct peer, meaning that AS path length is one. Since a leak cannot happen from a direct peer, such routes are given a leak score of 100 and returned. Next, it is checked if the peer ASN for the router belongs to a transit ISP. A transit AS is one that just passes the traffic that is neither originated from it nor is destined to it. Finally, if another ASN other than the direct peer on the AS path is a transit AS, then a leak has happened, and it is given a score of 0 and returned to the route collector.

The route collector adds these hijack and leak scores to the rest of routing information and makes them available for querying and analysis.

The BGP Speaker can make any route announcements to any router the same that any peer will do. route collector can communicate any requested changes to the routing plane to the BGP speaker and announce to the routers through it.

Additional Examples

Some aspects and examples disclosed herein are directed to a system for route anomaly detection and remediation comprising: a processor; and a computer-readable medium storing instructions that are operative upon execution by the processor to: perform, by a set of analysis components, a prefix analysis on a routing prefix associated with an internet protocol (IP) address of a selected route in a set of routes received from a set of routers to generate a set of scores, the prefix analysis comprising at least one of route hijack detection, route leak detection or route withdrawn detection; provide a centralized querying system for all the routers from all devices to study any routing history; generate, by a scoring component, a validation score indicating whether the selected route is a healthy route or an unhealthy route based on the set of scores received from the set of analysis components; assign, by a validation component, the selected route to a set of validated routes for utilization during routing of network traffic by the set of routers responsive to the validation score indicating the selected route is a healthy route; and send, by an alert component, an alert to a fault alerting system responsive to the validation score indicating the selected route is an unhealthy route, the unhealthy route comprising a hijacked route, a leaked route or a withdrawn route.

Additional aspects and examples disclosed herein are directed to a method for route anomaly detection and remediation comprising: performing a prefix analysis on a routing prefix associated with each route in a set of routes received from a set of routers, by a set of analysis components, the prefix analysis comprising at least one of route hijack detection, route leak detection or route withdrawn detection; generating a validation score for each route in the set of routes indicating whether each route is a healthy route or an unhealthy route; and identifying a set of validated routes from the set of routes for utilization during routing of network traffic by the set of routers based on the validation score for each route, wherein routes from the set of routes having the validation score indicate a healthy route are assigned to the set of validated routes for utilization by the set of routers.

Additional aspects and examples disclosed herein are directed to one or more computer storage devices having computer-executable instructions stored thereon for multi-phase distributed task coordination, which, on execution by a computer, cause the computer to perform operations comprising: performing a prefix analysis on an IP address routing prefix associated with a selected route in a set of routes received from a set of routers, by a set of analysis components, the prefix analysis comprising at least one of route hijack detection, route leak detection or route withdrawn detection; generating a validation score indicating whether the selected route is a healthy route or an unhealthy route; and sending at least one alert to a fault alerting system responsive to the validation score indicating the selected route is an unhealthy route, the unhealthy route comprising at least one the unhealthy route comprises a hijacked route, a leaked route or a withdrawn route.

Some aspects disclosed herein are directed to solutions for a route anomaly detection and remediation system. The system includes a processor and a computer-readable medium storing instructions. A set of analysis components performs a prefix analysis on a routing prefix associated with a selected route in a set of routes received from a set of routers to generate a set of scores. The prefix analysis includes a route hijack detection, route leak detection and/or route withdrawn detection. A scoring component generates a validation score indicating whether the selected route is a healthy route, or an unhealthy route based on the set of scores received from the set of analysis components. A healthy route is a route which has passed the anomalous route detection analysis and/or been validated for utilization within the network. An unhealthy route is an anomalous route or a route that is potentially anomalous. The unhealthy routes remain unvalidated after anomalous route detection analysis based on the score(s) assigned to the route. If the validation score indicates the route is a healthy route, the selected route is assigned to a set of validated routes which are available for utilization during routing of network traffic by the set of routers. If the validation score indicates the selected route is an unhealthy route due to potential that the route is a hijacked route, leaked route or withdrawn route, an alert is sent to notify a fault alerting system of the anomalous route.

Other examples provide a method of route anomaly detection and remediation. A prefix analysis is performed on a routing prefix associated with each route in a set of routes received from a set of routers. A validation score is generated for each route in the set of routes indicating whether each route is a healthy route or an unhealthy route. A set of validated routes from the set of routes are identified for utilization during routing of network traffic by the set of routers based on the validation scores. Routes from the set of routes having the validation score indicate a healthy route are assigned to the set of validated routes for utilization by the set of routers.

Yet other examples provide a computer storage device having computer-executable instructions stored thereon for route anomaly detection and remediation. A prefix analysis is performed on an IP address routing prefix associated with a selected route in a set of routes received from a set of routers, by a set of analysis components. The prefix analysis comprising route hijack detection, route leak detection and/or route withdrawn detection. A scoring component generates a validation score indicating whether the selected route is a healthy route or an unhealthy route. An alert component sends an alert to a fault alerting system responsive to the validation score indicating the selected route is an unhealthy route. The unhealthy route can be a hijacked route, a leaked route or a withdrawn route.

Alternatively, or in addition to the other examples described herein, examples include any combination of the following:
- analyze an origin autonomous systems (AS) portion of the routing prefix associated with the selected route to determine whether the selected route is hijacked;
- store a copy of each route in the set of routes received at a server;
- send a selected route in the set of routes to a partition in a set of partitions for analysis;
- perform route withdrawn detection, wherein the route withdrawn detection comprises analyzing route-related data describing activity associated with the selected route to determine if the selected route is a withdrawn route;
- wherein the activity associated with the selected route includes at least one of suspicious activity associated with the route, ownership of the route, inconsistent publication of the route, and inconsistent announcement of the route;
- perform new prefix validation on a routing prefix associated with the selected route if the routing prefix is unrecognized;
- identify a set of invalidated routes in the set of routes;
- remove the set of invalidated routes from the network;
- wherein the set of invalidated routes are stored in a set of stored routes, and wherein the set of invalidated routes are disqualified from utilization by the set of routers;
- receive at least two scores in a set of scores associated with the selected route, the at least two scores generated based on the prefix analysis, wherein each score in the set of scores is generated by a selected microservice in a set of microservices, wherein each score indicates whether route analysis results generated by the selected microservice suggest the analyzed route is valid or invalid;
- generate the validation score based on an aggregation of the at least two scores;
- providing a centralized view and analysis of all routes seen by a network;
- a hijack analysis component within the set of analysis components;
- wherein the hijack analysis component analyzes an origin AS portion of the routing prefix associated with a selected route to determine whether the selected route is hijacked;
- the hijack analysis component generates a hijack analysis score based on a result of the route hijack detection analysis on the selected route prefix;
- a leak analysis component within the set of analysis components;
- the leak analysis components analysis a peer AS portion of the routing prefix of a selected route in the set of routes to determine whether the selected route is a leaked route;
- the leak analysis component generates a leak analysis score based on a result of the route leak detection analysis on the selected route prefix;
- a withdrawal analysis component within the set of analysis components;
- the withdrawal analysis component performs the route withdrawn detection;
- the route withdrawn detection comprises analyzing route-related data describing activity associated with selected route to determine if a selected route is a withdrawn route;
- the withdrawal analysis component generates a withdrawal analysis score based on a result of the route withdrawn detection analysis on the selected route prefix;
- perform new prefix validation, by the set of analysis components, on a routing prefix associated with a new route;
- identify a set of invalidated routes in the set of routes;
- remove the set of invalidated routes from the network;
- removing a route from a set of stored routes on a route monitoring component a threshold number of days after the route is withdrawn
- the set of invalidated routes are stored in a set of stored routes associated with a route monitoring component;
- the set of invalidated routes are disqualified from utilization by the set of routers;
- receive, from the set of analysis components, at least one score associated with a selected route in the set of routes, the at least score is generated based on the prefix analysis;
- generate the validation score, by a scoring component, based on an aggregation of the at least one score received from the set of analysis components;
- performing a prefix analysis on a routing prefix associated with an IP address for each route in a set of routes received from a set of routers, by a set of analysis components;
- the prefix analysis comprising at least one of route hijack detection, route leak detection or route withdrawn detection;
- generating a validation score indicating whether a selected route in the set of routes is a healthy route or an unhealthy route;
- identifying a set of validated routes from the set of routes for utilization during routing of network traffic by the set of routers responsive to the validation score indicating at least one route in the set of routes is a healthy route;
- routes from the set of routes excluded from the set of validated routes are unhealthy routes which are invalidated for utilization by the set of routers;
- receiving, from the set of analysis components, at least one score associated with a selected route in the set of routes, the at least score is generated based on the prefix analysis;
- generating the validation score, by a scoring component, based on an aggregation of the at least one score received from the set of analysis components;
- storing, by a route storage component, a copy of each route in the set of routes received at a server hosting at least one route monitoring component;
- sending a selected route in the set of routes to a partition associated with a selected route monitoring component for analysis by the set of analysis components; and
- providing a centralized view and analysis of all routes that are seen by a network.

While the aspects of the disclosure have been described in terms of various examples with their associated operations, a person skilled in the art would appreciate that a combination of operations from any number of different examples is also within scope of the aspects of the disclosure.

Example Operating Environment

FIG. 12 is a block diagram of an example computing device 1200 for implementing aspects disclosed herein and is designated generally as computing device 1200. Computing device 1200 is an example of a suitable computing environment and is not intended to suggest any limitation as to the scope of use or functionality of the examples disclosed herein. Neither should the computing device 1200 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1200 includes a bus 1210 that directly or indirectly couples the following devices: computer-storage memory 1212, one or more processors 1214, one or more presentation components 1216, I/O ports 1218, I/O components 1220, a power supply 1222, and a network component 1224. While computing device 1200 is depicted as a seemingly single device, multiple computing devices 1200 may work together and share the depicted device resources. For example, memory 1212 may be distributed across multiple devices, and processor(s) 1214 may be housed with different devices.

Bus 1210 represents what may be one or more busses (such as an address bus, data bus, or a combination thereof). Although the various blocks of FIG. 12 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 12 and the references herein to a "computing device." Memory 1212 may take the form of the computer-storage media references below and operatively provide storage of computer-readable instructions, data structures, program modules and other data for computing device 1200. In some examples, memory 1212 stores one or more of an operating system, a universal application platform, or other program modules and program data. Memory 1212 is thus able to store and access data 1212*a* and instructions 1212*b* that are executable by processor 1214 and configured to carry out the various operations disclosed herein.

In some examples, memory 1212 includes computer-storage media in the form of volatile and/or nonvolatile memory, removable or non-removable memory, data disks in virtual environments, or a combination thereof. Memory 1212 may include any quantity of memory associated with or accessible by computing device 1200. Memory 1212 may be internal to computing device 1200 (as shown in FIG. 12), external to computing device 1200 (not shown), or both (not shown). Examples of memory 1212 in include, without limitation, random access memory (RAM); read only memory (ROM); electronically erasable programmable read only memory (EEPROM); flash memory or other memory technologies or other optical or holographic media; magnetic cassettes, magnetic tape, magnetic disk storage or other magnetic storage devices; memory wired into an analog computing device; or any other medium for encoding desired information and for access by computing device 1200. Additionally, or alternatively, memory 1212 may be distributed across multiple computing devices 1200, for example, in a virtualized environment in which instruction processing is carried out on multiple computing devices 1200. For the purposes of this disclosure, "computer storage media," "computer-storage memory," "memory," and "memory devices" are synonymous terms for computer-storage memory 1212, and none of these terms include carrier waves or propagating signaling.

Processor(s) 1214 may include any quantity of processing units that read data from various entities, such as memory 1212 or I/O components 1220 and may include CPUs and/or GPUs. Specifically, processor(s) 1214 are programmed to execute computer-executable instructions for implementing aspects of the disclosure. The instructions may be performed by the processor, by multiple processors within computing device 1200, or by a processor external to client computing device 1200. In some examples, processor(s) 1214 are programmed to execute instructions such as those illustrated in the in the accompanying drawings. Moreover, in some examples, processor(s) 1214 represent an implementation of analog techniques to perform the operations described herein. For example, the operations may be performed by an analog client computing device 1200 and/or a digital client computing device 1200. Presentation component(s) 1216 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1200, across a wired connection, or in other ways. I/O ports 1218 allow computing device 1200 to be logically coupled to other devices including I/O components 1220, some of which may be built in. Example I/O components 1220 include, for example but without limitation, a microphone, joystick, game pad, satellite dish, scanner, printer, wireless device, etc.

Computing device 1200 may operate in a networked environment via network component 1224 using logical connections to one or more remote computers. In some examples, network component 1224 includes a network interface card and/or computer-executable instructions (e.g., a driver) for operating the network interface card. Communication between computing device 1200 and other devices may occur using any protocol or mechanism over any wired or wireless connection. In some examples, network component 1224 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1224 communicates over wireless communication link 1226 and/or a wired communication link 1226a to a cloud resource 1228 across network 1230. Various different examples of communication links 1226 and 1226a include a wireless connection, a wired connection, and/or a dedicated link, and in some examples, at least a portion is routed through the internet.

Although described in connection with an example computing device 1200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for route anomaly detection and remediation, the system comprising:
   a processor; and
   a computer-readable medium storing instructions for route monitoring that are operative upon execution by the processor to:
   perform a prefix analysis on a routing prefix associated with an internet protocol (IP) address of a selected route in a set of routes received from at least one router device in a set of routers, the prefix analysis comprising:
   decoding at least one message received from the at least one router device to convert route data to a compatible data structure for analysis to detect unhealthy routes, including leaked routes; and
   analyzing a peer autonomous system (AS) portion of the routing prefix of the selected route to determine whether the selected route is a leaked route;
   based on the prefix analysis, generate a plurality of scores associated with the selected route, the scores generated by a selected microservice of a set of microservices, wherein each of the scores indicate whether route analysis results generated by the selected microservice are indicative of whether the analyzed route is valid or invalid;

based on an aggregation of the scores, generate a validation score indicating whether the selected route is a healthy route or an unhealthy route based on the prefix analysis;
assign the selected route to a set of validated routes for utilization during routing of network traffic by the set of routers responsive to the validation score indicating the selected route is a healthy route; and
send an alert to a fault alerting system responsive to the validation score indicating the selected route is an unhealthy route.

2. The system of claim 1, wherein the instructions for route monitoring are further operative to:
analyze an origin autonomous systems (AS) portion of the routing prefix associated with the selected route to determine whether the selected route is hijacked.

3. The system of claim 1, wherein the instructions for route monitoring are further operative to:
store a copy of each route in the set of routes received at a server; and
send a selected route in the set of routes to a partition in a set of partitions for analysis.

4. The system of claim 1, wherein the instructions for route monitoring are further operative to:
perform route withdrawn detection, wherein the route withdrawn detection comprises analyzing route-related data describing activity associated with the selected route to determine if the selected route is a withdrawn route, wherein the activity associated with the selected route includes at least one of suspicious activity associated with the route, ownership of the route, inconsistent publication of the route, and inconsistent announcement of the route.

5. The system of claim 1, wherein the instructions for route monitoring are further operative to:
perform new prefix validation on a routing prefix associated with the selected route if the routing prefix is unrecognized.

6. The system of claim 1, wherein the instructions for route monitoring are further operative to:
identify a set of invalidated routes in the set of routes; and
remove the set of invalidated routes from the network, wherein the set of invalidated routes are stored in a set of stored routes, and wherein the set of invalidated routes are disqualified from utilization by the set of routers.

7. The system of claim 1, wherein the instructions for route monitoring are further operative to:
receive at least two scores in a set of scores associated with the selected route, the at least two scores generated based on the prefix analysis, wherein each score in the set of scores is generated by a selected microservice in a set of microservices, wherein each score indicates whether route analysis results generated by the selected microservice suggest the analyzed route is valid or invalid; and
generate the validation score based on an aggregation of the at least two scores.

8. A method of route anomaly detection and remediation, the method comprising:
performing a prefix analysis on a routing prefix associated with an internet protocol (IP) address of a selected route in a set of routes received from at least one router device in a set of routers, the prefix analysis comprising:
decoding at least one message received from the at least one router device to convert route data to a compatible data structure for analysis to detect unhealthy routes, including hijacked routes; and
analyzing an origin autonomous system (AS) portion of the routing prefix associated with a selected route from the set of routes to determine whether the selected route is a hijacked route;
based on the prefix analysis, generate a plurality of scores associated with the selected route, the scores generated by a selected microservice of a set of microservices, wherein each of the scores indicate whether route analysis results generated by the selected microservice are indicative of whether the analyzed route is valid or invalid;
based on an aggregation of the scores, generating a validation score for each route in the set of routes indicating whether each route is a healthy route or an unhealthy route based on the prefix analysis;
identifying a set of validated routes from the set of routes for utilization during routing of network traffic by the set of routers based on the validation score for each route, wherein routes from the set of routes having the validation score indicate a healthy route are assigned to the set of validated routes for utilization by the set of routers;
identifying a set of invalidated routes in the set of routes, the set of invalidated routes including one or more hijacked routes; and
removing the set of invalidated routes from the network.

9. The method of claim 8, further comprising:
sending a selected route in the set of routes to a partition in a set of partitions for analysis.

10. The method of claim 8, further comprising:
performing route leak detection on a selected route in the set of routes, wherein a peer AS portion of the routing prefix of the selected route in the set of routes is analyzed to determine whether the selected route is a leaked route.

11. The method of claim 8, further comprising:
analyzing route-related data describing activity associated with a selected route to determine if a selected route is a withdrawn route, wherein the activity associated with the selected route includes at least one of suspicious activity associated with the route, ownership of the route, inconsistent publication of the route, and inconsistent announcement of the route.

12. The method of claim 11, further comprising:
removing a route from a set of stored routes a threshold number of days after the route is withdrawn.

13. The method of claim 8, wherein the set of invalidated routes are stored in a set of stored routes, and wherein the set of invalidated routes are disqualified from utilization by the set of routers.

14. The method of claim 8, further comprising:
receiving at least two scores in a set of scores associated with the selected route, the at least two scores generated based on the prefix analysis, wherein each score in the set of scores is generated by a selected microservice in a set of microservices, wherein each score indicates whether route analysis results generated by the selected microservice suggest the analyzed route is valid or invalid; and
generating the validation score based on an aggregation of the at least two scores.

15. The method of claim 8, further comprising:
providing a centralized view and analysis of all routes seen by a network.

16. One or more computer storage devices having computer-executable instructions stored thereon for route anomaly detection and remediation, which, on execution by a computer, cause the computer to perform operations comprising:

performing a prefix analysis on an IP address routing prefix associated with a selected route in a set of routes received from at least one router device in a set of routers, the prefix analysis comprising:

decoding at least one message received from the at least one router device to convert route data to a compatible data structure for analysis to detect unhealthy routes, wherein an unhealthy route comprises a hijacked route or a leaked route; and analyzing an origin AS portion of the routing prefix associated with a selected route from the set of routes to determine whether the selected route is a hijacked route;

analyze a peer AS portion of the routing prefix of the selected route to determine whether the selected route is a leaked route;

based on the prefix analysis, generate a plurality of scores associated with the selected route, the scores generated by a selected microservice of a set of microservices, wherein each of the scores indicate whether route analysis results generated by the selected microservice are indicative of whether the analyzed route is valid or invalid;

based on an aggregation of the scores, generating a validation score indicating whether the selected route is a healthy route or an unhealthy route based on the prefix analysis; and sending at least one alert to a fault alerting system responsive to the validation score indicating the selected route is an unhealthy route, the unhealthy route comprising at least one of a hijacked route, a leaked route or a withdrawn route.

17. The one or more computer storage devices of claim 16, wherein the operations further comprise:

assigning the selected route to a set of validated routes for utilization during routing of network traffic by the set of routers responsive to the validation score indicating the selected route is a healthy route.

18. The one or more computer storage devices of claim 16, wherein the operations further comprise:

sending a selected route in the set of routes to a partition in a set of partitions for analysis.

19. The one or more computer storage devices of claim 16, wherein the operations further comprise:

storing a copy of each route in the set of routes received at a server.

20. The one or more computer storage devices of claim 16, wherein the operations further comprise:

providing a centralized view and analysis of all routes seen by a network.

* * * * *